US010291779B2

(12) United States Patent
Maekawa et al.

(10) Patent No.: US 10,291,779 B2
(45) Date of Patent: May 14, 2019

(54) CALL CENTER SYSTEM AND COMPUTER ACCESSIBLE MEDIUM STORING A PROGRAM FOR A CALL CENTER

(71) Applicant: NEURONET INC., Tokyo (JP)

(72) Inventors: Hirofumi Maekawa, Tokyo (JP); Hidekazu Kubota, Tokyo (JP)

(73) Assignee: NEURONET INC., Machida-shi, Tokyo (JP)

( * ) Notice: Subject to any disclaimer, the term of this patent is extended or adjusted under 35 U.S.C. 154(b) by 394 days.

(21) Appl. No.: 14/916,095

(22) PCT Filed: Apr. 8, 2014

(86) PCT No.: PCT/JP2014/060146
§ 371 (c)(1),
(2) Date: Mar. 2, 2016

(87) PCT Pub. No.: WO2015/056462
PCT Pub. Date: Apr. 23, 2015

(65) Prior Publication Data

US 2016/0205252 A1 Jul. 14, 2016

(30) Foreign Application Priority Data

Oct. 17, 2013 (JP) ................................ 2013-215896

(51) Int. Cl.
*H04M 3/51* (2006.01)
*H04M 3/54* (2006.01)
(Continued)

(52) U.S. Cl.
CPC ......... *H04M 3/5191* (2013.01); *H04M 3/527* (2013.01); *H04M 3/541* (2013.01); *H04M 7/003* (2013.01); *H04M 3/5183* (2013.01)

(58) Field of Classification Search
None
See application file for complete search history.

(56) References Cited

U.S. PATENT DOCUMENTS

2003/0165230 A1* 9/2003 Reuss ................ H04M 3/5183
379/265.02

FOREIGN PATENT DOCUMENTS

JP H11-346266 A 12/1999
JP 2000-332898 A 11/2000
(Continued)

OTHER PUBLICATIONS

International Search Report dated Jul. 1, 2014 issued in corresponding International Application No. PCT/JP2014/060146.
(Continued)

*Primary Examiner* — Harry S Hong
(74) *Attorney, Agent, or Firm* — Yokoi & Co., U.S.A.; Toshiyuki Yokoi

(57) ABSTRACT

An objective is to provide a call center system operable in accordance with various signaling specifications without causing an automatic call distributor to cope with the various signaling specifications. A call-originator terminal 101 includes a virtual call device 105 transmitting a different signal to a call center 100 from signaling. The call center 100 includes an automatic call distributor 118 selecting a terminal in a call-center-terminal group 102 upon receiving the signal from the virtual call device 105. In addition, the call-originator terminal 101 and the call center 100 include respective telecommunication-device control devices 107, 115, giving, to either one of the call-destination terminal 113 selected by the automatic call distributor 118 and the call-originator terminal 101, a telecommunication device ID of the other terminal, and causing the one terminal to start signaling for transmitting an actual call to the other terminal based on the telecommunication device ID.

18 Claims, 20 Drawing Sheets

(51) Int. Cl.
*H04M 3/527* (2006.01)
*H04M 7/00* (2006.01)

(56) References Cited

FOREIGN PATENT DOCUMENTS

| | | | |
|---|---|---|---|
| JP | 2000-341414 | A | 12/2000 |
| JP | 2004120045 | A | 4/2004 |
| JP | 2007067544 | A | 3/2007 |
| JP | 2007251763 | A | 9/2007 |
| JP | 2007-311853 | A | 11/2007 |
| JP | 2009071552 | A | 4/2009 |
| JP | 2010-200265 | A | 9/2010 |
| JP | 2011259188 | A | 12/2011 |

OTHER PUBLICATIONS

"Say hello to FaceTime for Mac", http://www.apple.com/mac/facetime/?cid=oas-us-domains-facetime.com.

Skype, [online], searched on Mar. 11, 2014, Internet <URL:http://www.skype.com/>.

WebRTC, [online], searched on Mar. 11, 2014, Internet <URL:http://www.webrtc.org/>.

Notification of Reasons for Refusal dated Jan. 25, 2017 for corresponding application No. 2015-542526 with English translation attached.

Decision of Refusal dated Jun. 27, 2017 for corresponding application No. 2015-542526 with English translation attached.

* cited by examiner

400

<VIRTUAL CALL>

401~<TRANSMISSION SCHEME DESIGNATION> CALL-BACK SCHEME </TRANSMISSION SCHEME DESIGNATION>

402~<CALL-ORIGINATOR URL>http:// ○○○○○○.co.jp/</CALL ORIGINATOR URL>

403~<CALL-ORIGINATOR NETWORK ID> ○○○○○○.co.jp:80</CALL-ORIGINATOR NETWORK ID>

404~<CALL-ORIGINATOR TELECOMMUNICATION DEVICE ID>caller@ ○○○○○○.co.jp</CALL-ORIGINATOR TELECOMMUNICATION DEVICE ID>

405~<CALL PURPOSE> BUSINESS </CALL PURPOSE>

406~<CALL-ORIGINATOR NAME> ○○Taro </CALL-ORIGINATOR NAME>

</VIRTUAL CALL>

*FIG. 4*

<a href="http://acd.OOOOOO.co.jp/">BUSINESS INQUIRY</a>

*FIG. 5*

| NETWORK ID | TELECOMMUNICATION DEVICE ID | SKILL | AGENT STATUS | TELECOMMUNICATION PARTY | STATUS CHANGE TIME AND DATE |
|---|---|---|---|---|---|
| op1.OOOOOO.co.jp | op1@OOOOOO.co.jp | BUSINESS | STANDBY STATUS | NONE | 2013/2/1 00:00:00 |
| op2.OOOOOO.co.jp | op2@OOOOOO.co.jp | SUPPORT | TELECOMMUNICATING STATUS | c1.OOOOOO.co.jp:80 | 2013/2/1 22:00:00 |
| ... | ... | ... | ... | ... | ... |

FIG. 11

| NETWORK ID | CALL-ORIGINATOR NAME | CALL-OUT PURPOSE | CUSTOMER STATUS | TELECOMMUNICATION PARTY | STATUS CHANGE TIME AND DATE |
|---|---|---|---|---|---|
| c1.OOOOOO.co.jp:80 | Taro SUZUKI | SUPPORT | TELECOMMUNICATING STATUS | op2.OOOOOO.co.jp | 2013/2/1 22:00:00 |
| c2.OOOOOO.co.jp:80 | Jiro YAMADA | BUSINESS | CALL ARRIVING STATUS | NONE | 2013/2/1 22:00:01 |
| ... | | ... | ... | ... | ... |

FIG. 12

| CALL-ORIGINATOR NETWORK ID | CALL-ORIGINATOR NAME | TELECOMMUNICATION PARTY | STATUS CHANGE TIME AND DATE |
|---|---|---|---|
| c1.OOOOOO.co.jp:80 | Taro SUZUKI | op2.OOOOOO.co.jp | 2013/2/1 22:10:00 |
| ... | ... | ... | ... |

FIG. 13

| CALL CENTER ID | NETWORK ID |
|---|---|
| 1 | http://acd. OOOOOO. co. jp/ |
| 2 | http://acd2. OOOOOO. co. jp/ |

| NETWORK ID | TELECOMMU-NICATION DEVICE ID | AGENT STATUS | TELE-COMMUNI-CATION PARTY | STATUS CHANGE TIME AND DATE |
|---|---|---|---|---|
| op1. ○○○○○○. co. jp | op1@ ○○○○○○ co. jp | STANDBY STATUS | NONE | 2013/2/1 00:00:00 |
| op2. ○○○○○○. co. jp | op2@ ○○○○○○. co. jp | TELE-COMMUNI-CATING STATUS | c1. ○○○○○○. co. jp:80 | 2013/2/1 22:00:00 |
| ⋮ | ⋮ | ⋮ | ⋮ | ⋮ |

400

<VIRTUAL CALL>
401~<TRANSMISSION SCHEME DESIGNATION> CALL-BACK SCHEME </TRANSMISSION SCHEME DESIGNATION>
402~<CALL-ORIGINATOR URL>// ○○○○○○.co.jp/</CALL ORIGINATOR URL>
403~<CALL-ORIGINATOR NETWORK ID> ○○○○○○.co.jp:80 </CALL-ORIGINATOR NETWORK ID>
404~<CALL-ORIGINATOR TELECOMMUNICATION DEVICE ID>caller@ ○○○○○○.co.jp</CALL-ORIGINATOR TELECOMMUNICATION DEVICE ID>
405~<CALL PURPOSE> BUSINESS </CALL PURPOSE>
406~<CALL-ORIGINATOR NAME> ○○Taro </CALL-ORIGINATOR NAME>
2200~<TELECOMMUNICATION-DEVICE TYPE DESIGNATION>A</TELECOMMUNICATION-DEVICE TYPE DESIGNATION>
</VIRTUAL CALL>

*FIG. 22*

<a href=“http://acd.○○○○○○.co.jp/A”> CALL FROM TELECOMMUNICATION DEVICE A</a>

*FIG. 24*

| NETWORK ID | TELECOMMUNI-CATION DEVICE ID | TELE-COMMUNI-CATION DEVICE TYPE | SKILL | AGENT STATUS | TELE-COMMUNI-CATION PARTY | STATUS CHANGE TIME AND DATE |
|---|---|---|---|---|---|---|
| op1. ○○○○○ ○. co. jp | op1@ ○○○○○ ○. co. jp | A, B | BUSINESS | STANDBY STATUS | NONE | 2013/2/1 00:00:00 |
| op2. ○○○○○ ○. co. jp | op2@ ○○○○○ ○. co. jp | B | SUPPORT | TELE-COMMUNI-CATING STATUS | c1. ○○○○○○. co. jp:80 | 2013/2/1 22:00:00 |
| ⋮ | ⋮ | | ⋮ | ⋮ | ⋮ | ⋮ |

CALL CENTER SYSTEM AND COMPUTER ACCESSIBLE MEDIUM STORING A PROGRAM FOR A CALL CENTER

This is a National Phase Application filed under 35 U.S.C. 371 as a national stage of PCT/JP2014/060146, filed Apr. 8, 2014, an application claiming the benefit of Japanese Application No. 2013-215896, filed Oct. 17, 2013, the content of each of which is hereby incorporated by reference in its entirety.

TECHNICAL FIELD

The present invention relates to a system and a computer accessible medium storing a program for a call center system to operate a call center.

BACKGROUND ART

In call center systems, in order to call out a call center and to have a telecommunication with an agent, a customer transmits a call to the call center using a telecommunication system like a telephone. The major process by the call center system is to distribute this call to an appropriate agent, and an Automatic Call Distributor (ACD) has been known which is a device that automatically distributes the call.

The customer means a person who calls out the call center, and includes a student, a service user, and the like. The agent means a person who is called out at the call center, and includes an instructor, an operator, a service provider, and the like.

In general telecommunication systems, when a telecommunication device transmits a call to another telecommunication device, a communication channel is established between the transmission-originator telecommunication device and the transmission-destination telecommunication device, and a telecommunication starts. A control on such a telecommunication is called a signaling. In the case of, for example, Public Switched Telephone Network (PSTN), when a user who attempts to make a phone call designates a telephone number, the transmission-originator telephone device transmits a call, and the call arrives to the transmission-destination telephone device indicated by the telephone number through a process by switching equipment. When a user who is to receive the telephone call picks up a telephone receiver, the telecommunication starts.

According to conventional automatic call distributors, by interrupting a signaling between the transmission-originator telecommunication device and the transmission-destination telecommunication device, an appropriate telecommunication device among the plurality of telecommunication devices is designated as the transmission destination relative to the call from a single transmission-originator telecommunication device, and the telecommunication starts. For example, an automatic call distributor has an own telephone number, and the customer transmits a call with the telephone number of the automatic call distributor being designated, and the automatic call distributor distributes the arriving call to the telecommunication device of an appropriate agent, thereby starting the telecommunication between the telecommunication device of the customer and that of the agent.

For example, Patent Document 1 discloses a system that distributes a call arriving to an automatic call distributor among a group of agents.

In addition, in recent years, as for telecommunication systems between remote locations, systems, such as the ISDN and the SIP telephone, which have respective signaling specifications standardized, and telecommunication systems, such as FaceTime (registered trademark, see Non-patent Document 1) and Skype (registered trademark, see also Non-patent Document 2) based on unique signaling specification to the manufacturer are becoming popular along with the popularization of Web cameras and smartphones.

Still further, in recent years, as an API for a new telecommunication system, standardization of webRTC is advancing.

PRIOR ART DOCUMENTS

Patent Document

Patent Document 1: Japan Patent No. 3934543

Non-Patent Document

Non-patent Document 1: FaceTime, [online], [searched on Mar. 11, 2014], Internet <URL:http://www.apple.com/ios/facetime/>

Non-patent Document 2: Skype, [online], [searched on Mar. 11, 2014], Internet <URL:http://www.skype.com/>

Non-patent Document 3: WebRTC, [online], [searched on Mar. 11, 2014], Internet <URL:http://www/webrtc.org/>

SUMMARY OF INVENTION

Technical Problem

So far, there are various telecommunication systems based on the unique signaling specification to the manufacturer, such as PSTN and SIP telephone, enabling the customer to freely select such a system. Among the telecommunication systems unique to the manufacturers, in particular, a telecommunication system built in a smartphone in advance (see, for example, Non-patent Document 1) is easy for the customer to utilize since the customer needs no installation work. Hence, it is desirable for the call center system to be able to cope with various telecommunication systems.

Automatic call distributors in conventional call center systems interrupt in the signaling between the telecommunication devices, and thus it is necessary for the automatic call distributor to operate in accordance with the signaling specification. Hence, when an automatic call distributor is set up so as to cope with the plurality of telecommunication systems and to enable the customer to freely select the telecommunication system, a process in accordance with the signaling specification different for each telecommunication system is necessary, increasing the development costs in comparison with a case in which the automatic call distributor is set up so as to cope with a single telecommunication system.

Like the WebRTC disclosed in Non-patent Document 3 coming into the market along with the popularization of the Web, it is expected that new telecommunication systems and API for such telecommunication systems will become available in future in accordance with a change in technical background. In order to keep enabling the customer to freely select the telecommunication system, it is necessary to set up the automatic call distributor so as to cope with the signaling specification of a telecommunication system that will become newly available in future, and thus it is desirable that the development costs should be low.

In particular, in the case of a telecommunication system based on the unique signaling specification to the manufacturer as explained above, no signaling specification is made available to the public at all in some cases. In this case, it is technically difficult to install an automatic call distributor.

However, in a telecommunication system based on the unique signaling specification to the manufacturer, although the signaling specification is not made available to the public, in order to accomplish a system interconnection, an API that starts a transmission of a call from the exterior is provided in some cases (see, for example, Non-patent Document 1 and Non-patent Document 2).

The present invention has been proposed in order to address the aforementioned technical problems of conventional technologies, and an objective is to provide a call center system that is capable of operating in accordance with various signaling specifications without causing an automatic call distributor to cope with the various signaling specifications.

Solution to Problem

In order to address the foregoing technical problem, a call center system according to the present invention includes:

a call center including a plurality of call center terminals utilized by an agent for telecommunication; and a call-originator terminal utilized by a customer for telecommunication, the call-originator terminal including a virtual call device transmitting a different signal to the call center from signaling, the call center including an automatic call distributor selecting one of the plurality of call center terminals upon receiving the signal from the virtual call device, and the call-originator terminal and the call center both including respective telecommunication-device control devices giving, to either one of the call center terminal selected by the automatic call distributor and the call-originator terminal, a telecommunication device ID of the other terminal, and causing the one terminal to start signaling for transmitting an actual call to the other terminal based on the telecommunication device ID.

A computer may be caused to function as the call center system by a program.

Advantageous Effects of Invention

According to the present invention, since the automatic call distributor is not involved in signaling, it is unnecessary to implement a process in accordance with a signaling specification different for each telecommunication system so as to cope with a plurality of telecommunication systems. In addition, the automatic call distributor is capable of receiving, from the virtual call device of the call-originator terminal, a different signal from the signaling, and distributing a call upon receiving the signal. This facilitates the call center system to cope with telecommunication systems that have various signaling specifications. Still further, even if the signaling specification is not available to the public, the call center system is facilitated to cope with telecommunication systems that have various signaling specifications.

BRIEF DESCRIPTION OF DRAWINGS

FIG. 4 is a diagram illustrating an example describing scheme of a virtual call in the call center system according to the embodiment of the present invention;

FIG. 5 is a diagram illustrating an example scheme of a transmission-destination device to store a network ID in the call center system according to the embodiment of the present invention;

FIG. 11 is a diagram illustrating an example table utilized for an agent status memory in the call center system according to the embodiment of the present invention;

FIG. 12 is a diagram illustrating an example table utilized for a customer status memory in the call center system according to the embodiment of the present invention;

FIG. 13 is a diagram illustrating an example table utilized for a past record memory in the call center system according to the embodiment of the present invention;

FIG. 22 is a diagram illustrating an example virtual call containing a telecommunication-device type designation in the call center system with the terminal that includes the plurality of telecommunication devices according to the embodiment of the present invention;

FIG. 24 is a diagram illustrating an example hyperlink of the call-out device in the call center system with the terminal that includes the plurality of telecommunication devices according to the embodiment of the present invention;

DESCRIPTION OF EMBODIMENTS

Embodiments of the present invention will be explained below with reference to the accompanying figures.

First Embodiment

Figure 1:
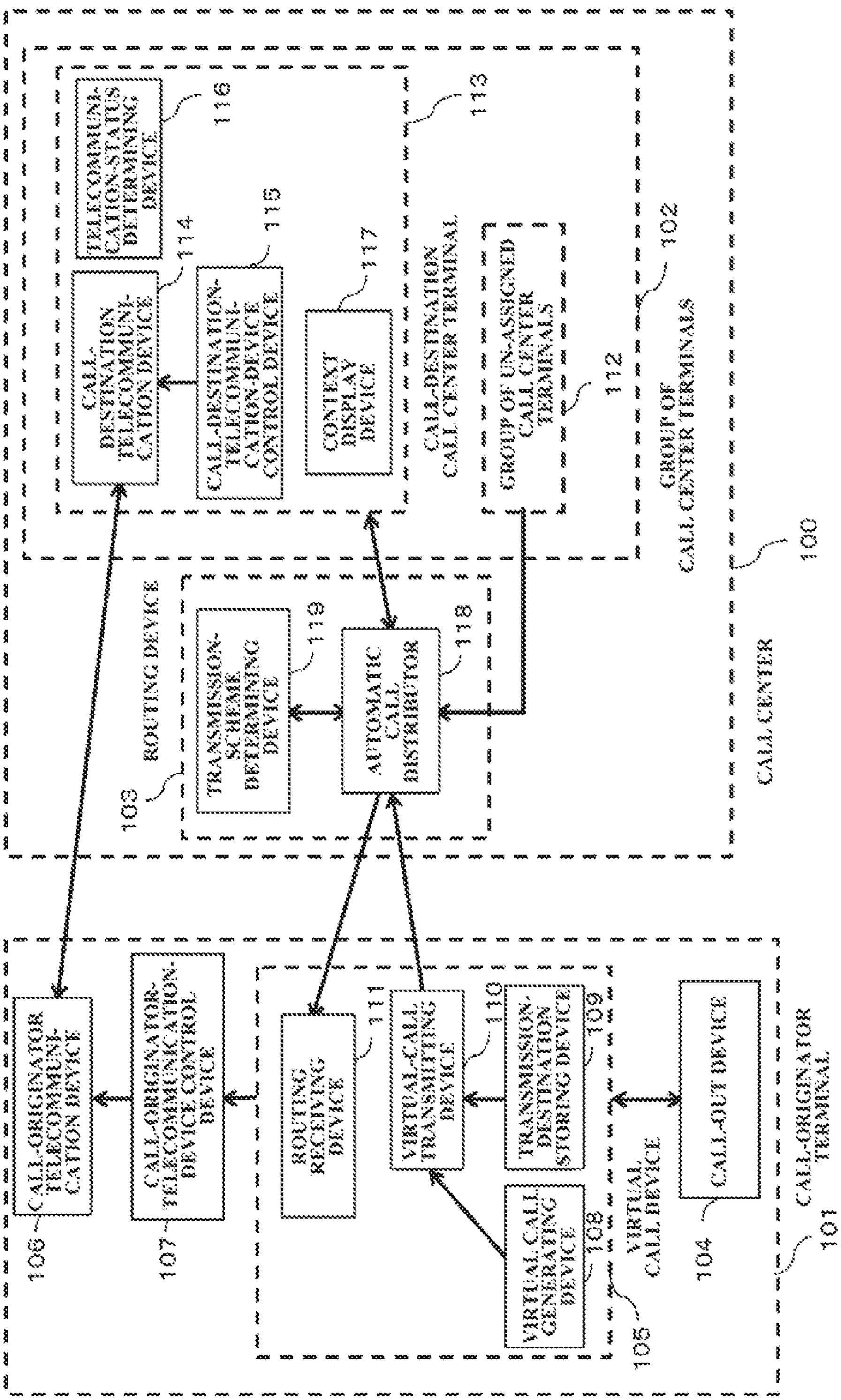
FIG. 1 is a schematic block diagram illustrating a call center system according to an embodiment of the present invention.

FIG. 1 is a schematic block diagram of an example call center system according to a first embodiment. The call center system includes a call center 100, and a call-originator terminal 101. The call center 100 includes a group 102 of call center terminals, and a routing device 103. A customer has the call-originator terminal 101, and calls out the call center 100 using the call-originator terminal 101. It is expected that the call center 100 is to be called out by respective terminals of the plurality of customers, and the call-originator terminal 101 represents one of such terminals. The routing device 103 assigns, as a call-destination call center terminal 113, one of the terminals in the call-center-terminal group 102 relative to a call-out from the call-originator terminal 101. Each call center terminal belonging to the call-center-terminal group 102 but in a status not assigned to the call-originator terminal 101 yet will be referred to as an un-assigned call-center-terminal group 112.

The call-originator terminal 101, each terminal in the call-center-terminal group 102, and the routing device 103 are each a device that includes a computer communicable with another device via a network, and are realized by such computer that executes a program. The program to be utilized is installed in the hard disk drive of such a computer. In addition, this program may be stored in a DVD-ROM, a server, and the like so as to be distributed.

The call-originator terminal 101, each terminal contained in the call-center-terminal group 102, and the routing device 103 are each, for example, a server, a smartphone, a tablet type personal computer, a mobile phone, a laptop computer, a desktop personal computer, or a mobile gaming device.

The call-originator terminal 101, the call-center-terminal group 102, and the routing device 103 may be utilized in respective different facilities, or may be utilized at respective remote locations connected via a network. In addition to the same facility, the call-center-terminal group 102 may also be installed in the same facility, or distributed at remote locations.

The call-originator terminal 101, each terminal contained in the call-center-terminal group 102, and the routing device 103 each include a network ID that is an identification notation defining the connection destination over the network. Example network IDs are a set of an IP address and a port number, a MAC address, an FQDN, and a URL.

The call-originator terminal 101 includes a call-out device 104 for the customer who calls out the call center 100, a virtual call device 105 that transmits a virtual call to the routing device 103 in accordance with the call-out operation, a call-originator telecommunication device 106 for a telecommunication with the agent, and a call-originator-telecommunication-device control device 107 which controls the call-originator telecommunication device 106 in accordance with an instruction from the virtual call device 105, and which starts a transmission of an actual call by the call-originator telecommunication device when the transmission scheme is a general transmission scheme. The call-originator telecommunication device 106 employs a signaling specification, and is one of a various telephone applications pre-installable in the call-originator terminal 101 or downloadable from a server over a network.

The virtual call device 105 includes a virtual call generating device 108 that generates the virtual call, a transmission-destination storing device 109 that stores the network ID of the routing device 103 which is a transmission destination of the virtual call, a virtual-call transmitting device 110 that transmits the virtual call to the network ID, and a routing receiving device 111 that receives a response from the routing device 103.

The call-destination call center terminal 113 includes a call-destination telecommunication device 114 for a telecommunication with the customer, a call-destination-telecommunication-device control device 115 which controls the call-destination telecommunication device 114, and which starts a transmission of a call by the call-destination telecommunication device when the transmission scheme is a call-back scheme, a telecommunication-status determining device 116 which determines a telecommunication status of the call-destination telecommunication device 114, and which notifies the routing device 103 of the determined status, and, a context displaying device 117 which obtains context information in the virtual call from the routing device 103, and which displays such information for the call-destination call center terminal 113.

The call-originator telecommunication device 106 and the call-destination telecommunication device 114 are each a telecommunication device distinguishable by a unique telecommunication device ID, connected with a telecommunication device that has a different telecommunication device ID from the own telecommunication device ID, thereby being communicable therewith.

Example telecommunication devices distinguishable by the unique telecommunication device ID are wired subscribed telephones and mobile subscribed telephones which are connected with the PSTN, and which have respective unique telephone numbers as the respective telecommunication device IDs.

An example telecommunication device distinguishable by the unique telecommunication device ID is an SIP telephone.

Other example telecommunication devices distinguishable by the unique telecommunication device ID are telecommunication devices disclosed in the aforementioned Non-patent Documents 1 and 2.

A further another example telecommunication device distinguishable by the unique telecommunication device ID is a telecommunication device built with the API for a telecommunication system. The API for the telecommunication system is, for example, the WebRTC that has its standardization advanced by W3C, or the RTMP produced by Adobe corporation.

An example telecommunication device ID is a character string that contains numbers and symbols.

Another example telecommunication device ID is a mail address utilizable as such a telecommunication device ID.

The other example telecommunication device ID is the network ID of a terminal utilizable as such a telecommunication device ID.

The term communication means a mutual information exchange by sounds, videos, still images, text chatting, and the like.

The routing device 103 includes an automatic call distributor 118 that assigns, as the call-destination call center terminal 113, one of the terminals in the call-center-terminal group 102 relative to the call-out from the call-originator terminal 101, and a transmission-scheme determining device 119 that determines from which one of the call-originator telecommunication device 106 and the call-destination telecommunication device 114 an actual call is to be transmitted.

According to the call center system employing such a structure, the automatic call distributor 118 is excluded from a signaling process so as not to interrupt a signaling. However, the automatic call distributor 118 has a role of selecting the call-destination call center terminal 113, and receives the virtual call from the virtual call device 105 in order to accomplish this role. The virtual call device 105 is a virtual-call transmitting device which generates a virtual call, and which transmits the virtual call to the automatic call distributor 118. The term virtual call means a signal not for a signaling, is in compliance with an executable protocol by the automatic call distributor 118, is a signal that triggers a selection of the call-destination call center terminal 113, and is a so-called selection request signal. In this first embodiment, the virtual call contains selection material information that will be a material for selection.

In addition, according to this call center system, the signaling process is executed by the call-originator telecommunication device 106 and the call-destination telecommunication device 114, and the automatic call distributor 118 is not involved in this signaling process. The automatic call distributor 118 selects the call-destination call center terminal 113 based on the received virtual call from the virtual call device 105, and the call-destination telecommunication device 114 and the call-originator telecommunication device 106 execute the signaling process, and an actual call is transmitted. As for the actual call, the routing device 103 gives the telecommunication device ID of the one device to another device in accordance with the transmission scheme, and the device that has received the telecommunication device ID starts the signaling process with the party device.

Figure 2:
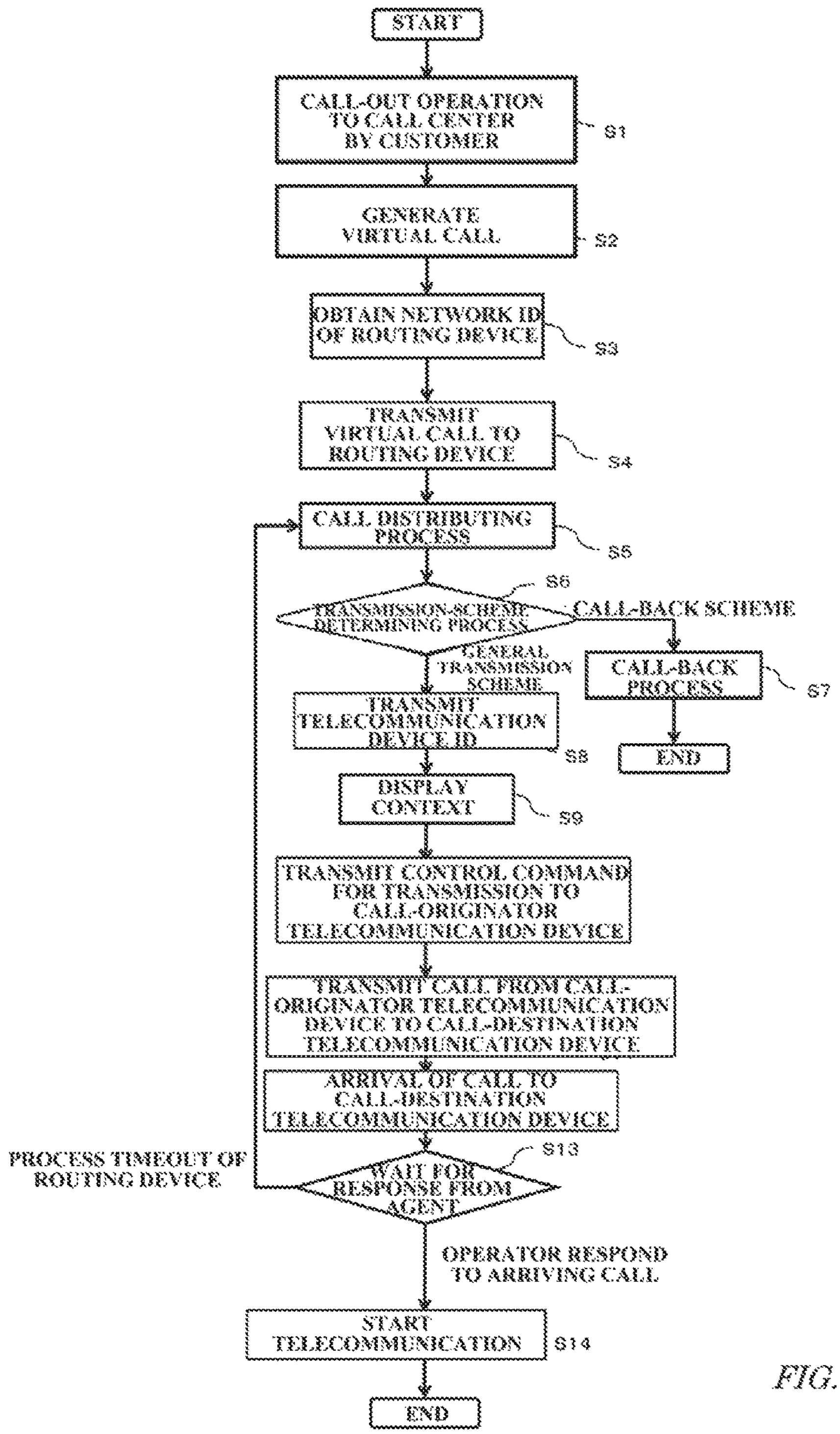
FIG. 2 is a diagram illustrating an example operation flowchart for a call-originator terminal to call out a call center in the call center system according to the embodiment of the present invention.

FIG. 2 is a diagram illustrating an example operation flowchart for the call-originator terminal 101 to call out the call center 100 in such a call center system. An explanation will be given below of an operation of the call-originator terminal 101 and that of the call center 100 with reference to this FIG. 2.

When the customer gives, in step S1, a call-out operation from the call-out device 104 to the call center 100, the call-out device 104 transmits a call-out start signal to the virtual call device 105, and the process advances to step S2.

Figure 3:
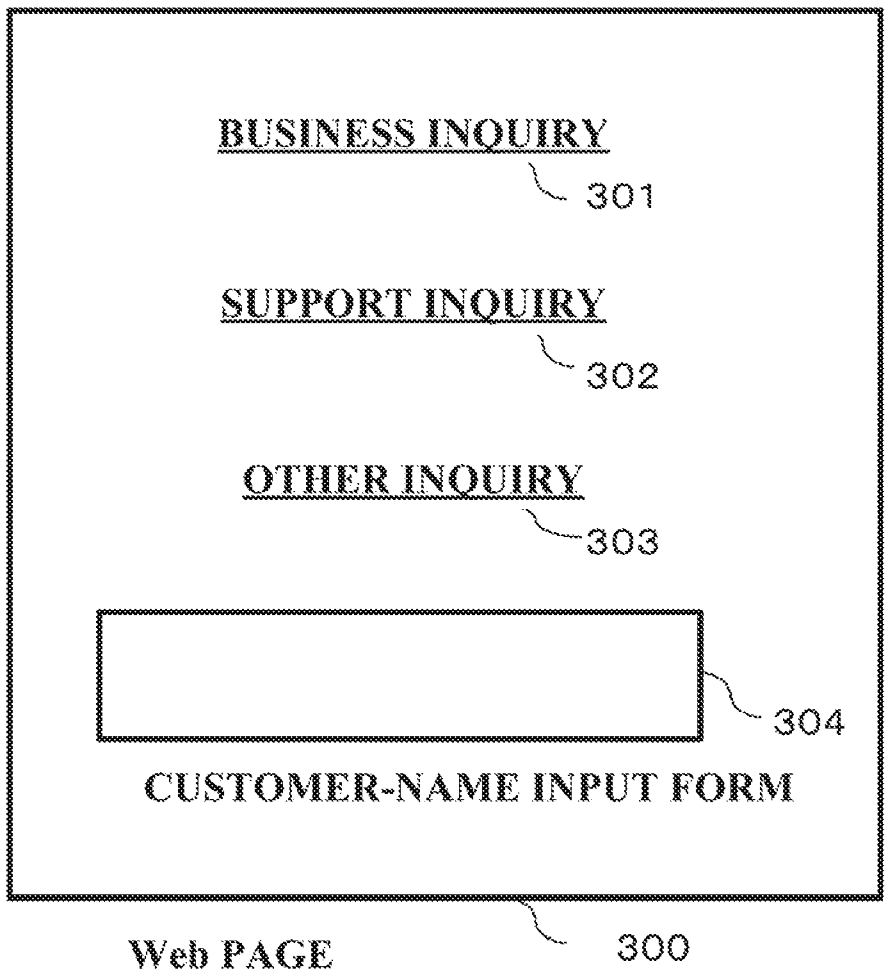
FIG. 3 is a diagram illustrating an example call-out device with a Web page containing a plurality of hyperlinks in the call center system according to the embodiment of the present invention.

FIG. 3 is a diagram illustrating an example call-out device 104. The call-out device 104 is a so-called man-machine interface to which necessary information for creating call-destination selection information is input by the customer, and is associated with the call center 100. This call-out device 104 is built for each call center 100 as a Web page 300 which is operable on a Web browser, and which includes a plurality of hyperlinks and a customer-name input form 304. The customer fills the customer-name input form 304 with the customer's name or leaves this form as empty, and selects any of the hyperlinks, thereby making a call-out to the call center 100. In FIG. 3, three hyperlinks displayed on the Web page 300 and selectable by the customer are hyperlinks 301, 302, and 303. A character string indicating a call-out purpose "business inquiry" is described as the hyperlink 301, a character string indicating another call-out purpose "support inquiry" is described as the hyperlink 302, and a character string indicating the other call-out purpose "other inquiry" is described as the hyperlink 303.

As illustrated in FIG. 3, setting up a selection operation of the hyperlink on the Web page as a call-out operation to the call center 100 has an advantage of enabling an association of information on the Web page with a call-out to the call center 100. For example, by providing, on the Web page that displays sales information on a commercial product, a hyperlink that enables a call-out to the call center 100 for the purpose of inquiry from the customer relating to the commercial product, an assist for the sales may be given. In addition, since a selection of a hyperlink is a general operation, setting up the selection operation of the hyperlink on the Web page as the call-out operation to the call center 100 decreases a burden for the customer.

Example methods of selecting the hyperlink by the customer are to click by mouse or to touch by finger.

When the virtual call device 105 receives, in the step S2, the call-out start signal from the call-out device 104, the virtual call generating device 108 generates the virtual call, and the process advances to step S3. The virtual call contains context information representing information to identify an appropriate call-destination call center terminal 113, information on the call-originator terminal 101, and information on the customer who is utilizing the call-originator terminal 101. The context information is utilized to determine the assignment of an appropriate agent by the routing device 103. In addition, the context information is displayed on the context displaying device 117, and is referred by the agent when having a telecommunication with the customer.

FIG. 4 is a diagram illustrating an example virtual call that is described in the XML format. The virtual call contains plural kinds of context information, and the plural kinds of context information is expressed by a plurality of sub elements of a <virtual call> element 400. An explanation will be given below of the plural kinds of context information contained in the virtual call with reference to this FIG. 4.

The virtual call has, as the context information, a transmission scheme designation utilized for the routing device 103 to define the transmission scheme. Example candidate transmission schemes applicable are a general transmission scheme that causes the call-originator telecommunication device 106 to transmit an actual call to the call-destination telecommunication device 114, and a call-back scheme that causes the call-destination telecommunication device 114 to transmit an actual call to the call-originator telecommunication device 106. In FIG. 4, the transmission scheme designation is expressed as a sub element of the <virtual call> element 400 which is <transmission scheme designation> element 401. When the transmission scheme will not be defined, the <transmission scheme designation> element 401 is defined as an empty element.

The virtual call contains a call-originator URL that is the context information. The call-originator URL is the URL of the Web page 300 obtained by the virtual call generating device 108 from the call-out device 104 to which the call-out operation has been given. In FIG. 4, the call-originator URL is expressed as <call-originator URL> element 402 that is a sub element of the <virtual call> element 400.

The virtual call has a call-originator network ID that is a context information for the routing device 103 to return a network response to the call-originator terminal 101. The call-originator network ID is the network ID of the call-originator terminal 101. In FIG. 4, the call-originator network ID is expressed as <call-originator network ID> element 403 that is a sub element of the <virtual call> element 400. Note that when the transmission scheme is the call-back scheme, the routing device 103 returns no network response to the call-originator terminal 101, and thus the <call-originator network ID> element 403 may be an empty element in this case.

The virtual call has a call-originator telecommunication device ID as the context information. The call-originator telecommunication device ID is the telecommunication device ID of the call-originator telecommunication device 106, and is necessary for the call-destination telecommunication device 114 to transmit a call to the call-originator telecommunication device 106 when the call center calls back the customer. In FIG. 4, the call-originator telecommunication device ID is expressed as <call-originator telecommunication device ID> element 404 that is a sub element of the <virtual call> element 400. Note that when the transmission scheme is the general transmission scheme, the call-destination telecommunication device 114 does not transmit a call to the call-originator telecommunication device 106, the <call-originator telecommunication device ID> element 404 may be an empty element in this case.

The virtual call has a call-out purpose as the context information that describes necessary selection material information to select an appropriate call-destination call center terminal 113. In FIG. 4, the call-out purpose is expressed as <call-out purpose> element 405 that is a sub element of the <virtual call> element 400. The call-out purpose is, for example, "business inquiry" or an abbreviation thereof "business", "support inquiry" or an abbreviation thereof "support".

As for the method of defining the call-out purpose, different purposes are associated with the plurality of hyperlinks in the Web page 300 in FIG. 3, respectively, and when the customer selects one of the plurality of hyperlinks to give the call-out operation, the virtual call generating device 108 obtains a purpose associated with the selected hyperlink, and defines as the call-out purpose.

The virtual call has a call-originator name as the context information. The call-originator name is the name of customer who gives the call-out operation. In FIG. 4, the call-originator name is expressed as <call-originator name> element 406 that is a sub element of the <virtual call> element 400. When the customer who has given the call-out operation is in anonimity, the <call-originator name> element 406 is defined as an empty element in this case.

As for the method of defining the call-originator name, a value input to the customer-name input form 304 is obtained by the virtual call generating device 108, and is defined as the call-originator name. When the customer-name input form 304 is left as empty, the customer name is handled as anonymous.

The virtual-call transmitting device 110 obtains, in the step S3, the network ID of the routing device 103 in the call-destination call center 100 from the transmission-destination storing device 109, and the process advances to step S4.

FIG. 5 is a diagram illustrating an example scheme for the transmission-destination storing device 109 to store the network ID. The transmission-destination storing device 109 stores, in the step S3, a value of a URL that is the network ID of the routing device 103 as a value of an href attribute of the element a using the HTML element as illustrated in FIG. 5.

The virtual-call transmitting device 110 obtains, in the step S3, the network ID of the routing device 103 from the selected hyperlink on the Web page 300 by the customer in the step S1. The hyperlink in the Web page 300 illustrated in FIG. 3 is associated with the HTML element as illustrated in FIG. 5, and for example, the HTML element for rendering the hyperlink 301 described as "business inquiry" on the Web browser corresponds to the HTML element illustrated in FIG. 5, and when the customer selects, in the step S1, the hyperlink 301, the virtual-call transmitting device 110 obtains a URL "http://acd.oooooo.co.jp/" indicated by the href attribute of the corresponding HTML element as the network ID of the routing device 103.

The virtual-call transmitting device 110 transmits, in the step S4, the virtual call to the routing device 103 that has the network ID obtained in the step S3, and the process advances to step S5.

The virtual-call transmitting device 110 transmits, in the step S4, the virtual call by a network connection script using an XMLHttpRequest that is a communication API built in the Web browser. By applying the XMLHttpRequest, a non-synchronous communication process is accomplishable on a general Web browser.

The automatic call distributor 118 of the routing device 103 executes, in the step S5, a call distributing process with the virtual call received from the virtual-call transmitting device 110, and the status of the call-center-terminal group 102 being as inputs, assigns the call-destination call center terminal 113 to the call-originator terminal 101 upon results of the call distributing process, and the process advances to step S6. The call distributing process will be explained later in more detail.

The transmission-scheme determining device 119 determines, in the step S6, the transmission scheme based on the transmission-scheme designation contained in the virtual call. When the determined transmission scheme is the call-back scheme, the process advances to step S7, and when the determined transmission scheme is the general transmission scheme, the process advances to step S8.

As an example method for the transmission-scheme determining device 119 to determine the transmission scheme in the step S6, when the virtual call contains the transmission-scheme designation, the details of the transmission-scheme designation are set up as the transmission scheme, and when the virtual call does not contain the transmission-scheme designation, the normal transmission scheme is set up as the transmission scheme.

The call center 100 performs, in the step S7, a call-back process from the call-destination telecommunication device 114 to the call-originator telecommunication device 106. The call-back process will be explained later in more detail.

The routing receiving device 111 receives, in the step S8, the telecommunication device ID of the call-destination telecommunication device 114 from the routing device 103, and the process advances to step S9. The reception of the telecommunication device ID is also performed by a network communication script utilizing the XMLHttpRequest.

The context displaying device 117 displays, in the step S9, the context information in the virtual call received by the routing device 103 for the agent who operates the call-destination call center terminal 113, and the process advances to step S10.

The context information in the virtual call includes the call-originator URL, the call-out purpose, the call-originator name, etc., and those pieces of information become a reference for the agent who operates the call-destination call center terminal 113 when servicing the customer.

The call-originator-telecommunication-device control device 107 receives, in the step S10, the telecommunication device ID of the call-destination telecommunication device 114 received by the routing receiving device 111, transmits, to the call-originator telecommunication device 106, a control command of instructing a start of a transmission of an actual call to the telecommunication device ID of the call-destination telecommunication device 114, and the process advances to step S11.

As an example method of realizing the above call-originator-telecommunication-device control device 107, by calling out a URL scheme that causes the Web browser on a smartphone OS to be linked with a telecommunication device application using a script that is operable on the Web browser, an instruction can be given from the telecommunication device application so as to start a transmission of a call to the specific telecommunication device ID. When, for example, the telecommunication device ID of the call-destination telecommunication device 114 is "callee@oooooo.co.jp", a URL scheme to start a transmission of an actual call to the FaceTime installed in a smartphone from a smartphone Web browser is a short character string that is "facetime://callee@oooooo.co.jp".

The call-originator telecommunication device 106 transmits, in the step S11, a call to the telecommunication device ID of the call-destination telecommunication device 114, and the process advances to step S12.

The call-destination telecommunication device 114 receives, in the step S12, the call from the call-originator telecommunication device 106, notifies the agent who operates the call-destination call center terminal 113 of the arrival of the call by a unique method to the call-destination telecommunication device 114, and the process advances to step S13.

Example methods of notifying the agent of the arrival of a call to the call-destination telecommunication device 114 are to output a ringer melody from the call-destination call center terminal 113, to vibrate the call-destination call center terminal 113, and to display letters and images indicating the arrival of the call on the display device of the call-destination call center terminal 113.

When the agent who operates the call-destination call center terminal 113 gives a response operation in the step S13 to the arrival of the call from the call-originator telecommunication device 106, the telecommunication-status determining device 116 gives a notification that the call-destination telecommunication device 114 becomes a telecommunication status to the routing device 103, and the process advances to step S14. When a process timeout occurs at the routing device 103 before receiving the notification of the start of the telecommunication, the process returns to the step S5.

Example response operations to the arrival of the call for telecommunication from the call-originator telecommunication device 106 are actions of the agent, such as to pick up the telephone receiver, and to depress a respond button.

The telecommunication starts in the step S14 between the call-originator telecommunication device 106 and the call-destination telecommunication device 114, and the call-out operation from the call-originator terminal 101 to the call center 100 ends.

Figure 6:
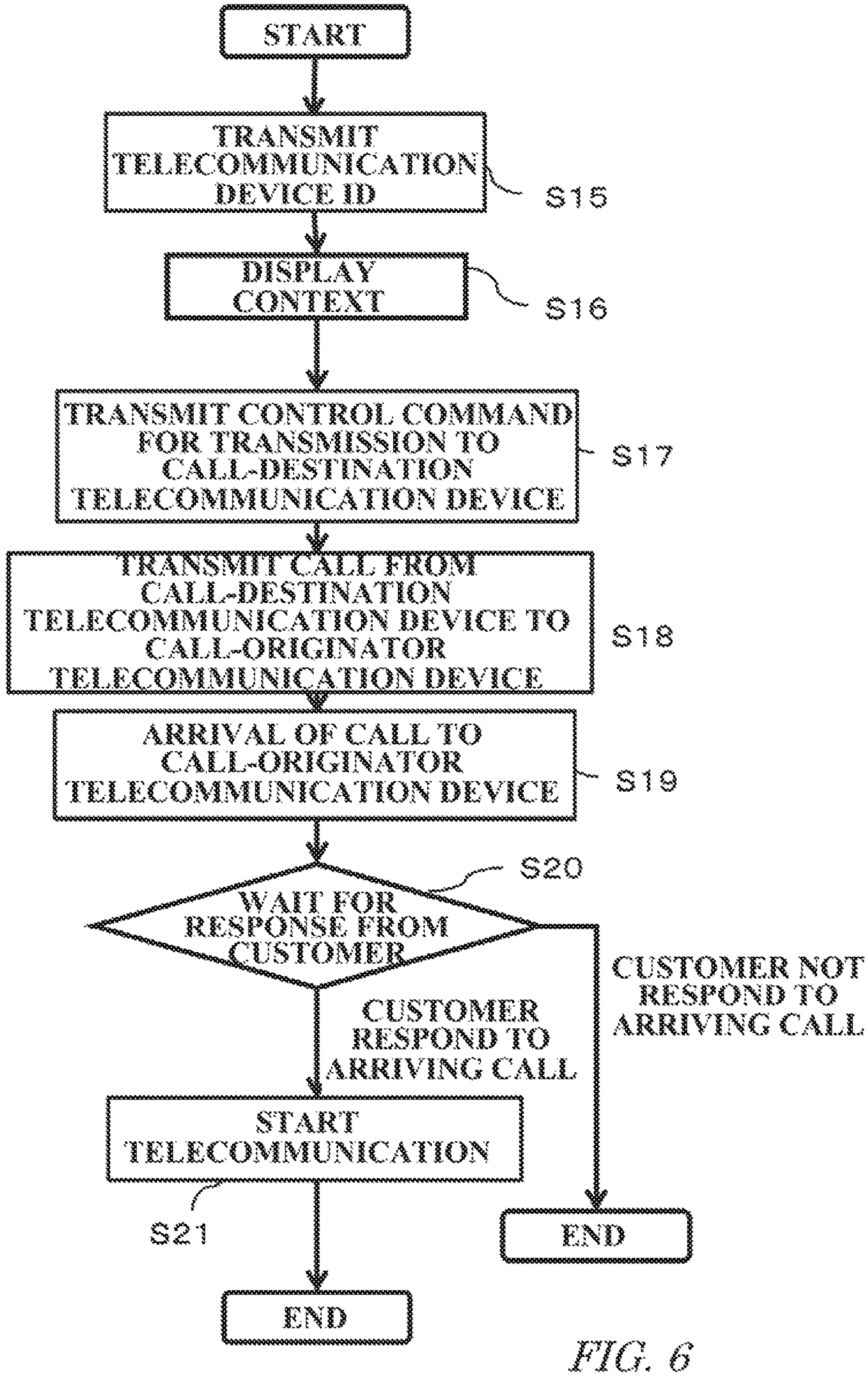
FIG. 6 is a diagram illustrating an example operation flowchart for a call-back process in the call center system according to the embodiment of the present invention.

FIG. 6 is a diagram illustrating an example operation flowchart of the call-back process in the step S7 in FIG. 2. The call-back process will be explained below with reference to this FIG. 6.

When the call-back process in the step S7 in FIG. 2 starts, the process advances to step S15. The routing device 103 transmits, in the step S15, the telecommunication device ID of the call-originator telecommunication device 106 to the call-destination-telecommunication-device control device 115, and the process advances to step S16.

The context display device 117 displays, in the step S16, the context information in the virtual call received by the routing device 103 for the agent who operates the call-destination call center terminal 113, and the process advances to step S17.

The context information in the virtual call contains the call-originator URL, the call-out purpose, the call-originator name, and the like, and those pieces of information become a reference for the agent who operates the call-destination call center terminal 113 when servicing the customer.

The call-destination-telecommunication-device control device 115 receives, in the step S17, the telecommunication device ID of the call-originator telecommunication device 106 which is received from the routing device 103, and transmits, to the call-destination telecommunication device 114, a control command of instructing the start of a transmission of an actual call to the telecommunication device ID of the call-originator telecommunication device 106, and, the process advances to step S18.

An example method of realizing the above call-destination-telecommunication-device control device 115 is a method of utilizing the URL scheme like the call-originator-telecommunication-device control device 107.

The call-destination telecommunication device 114 transmits, in the step S18, a call to the telecommunication device ID of the call-originator telecommunication device 106, and the process advances to step S19.

The call-originator telecommunication device 106 receives, in the step S19, the call from the call-destination telecommunication device 114, notifies the customer who operates the call-originator terminal 101 of the arrival of the call by the unique method to the call-originator telecommunication device 106, and, the process advances to step S20.

An example method of notifying the customer of the arrival of the call from the call-destination telecommunication device 114 is to output a ringer melody from the call-originator terminal 101, to vibrate the call-originator terminal 101, or to display letters and images indicating the arrival of the call on the display device of the call-originator terminal 101.

When the customer who operates the call-originator terminal 101 gives a response operation in the step S20 to the arrival of the call from the call-destination telecommunication device 114, the telecommunication-status determining device 116 gives a telecommunication start notification to the routing device 103 to the effect that the call-destination telecommunication device 114 becomes the telecommunication status, and the process advances to step S21. When the process timeout occurs at the routing device 103 before receiving the telecommunication start notification, the telecommunication-status determining device determines that a call-out is unsuccessful since the customer does not respond to the arrival of the call, and ends the process.

An example response operation to the arrival of the call for telecommunication from the call-destination telecommunication device 114 is an action of the customer, such as to pick up the telephone receiver, to depress the respond button, and the like.

The telecommunication between the call-destination telecommunication device 114 and the call-originator telecommunication device 106 starts in the step S21, and the call-out operation from the call-originator terminal 101 to the call center 100 ends as a call-back from the agent at the call center to the customer.

Figure 7:
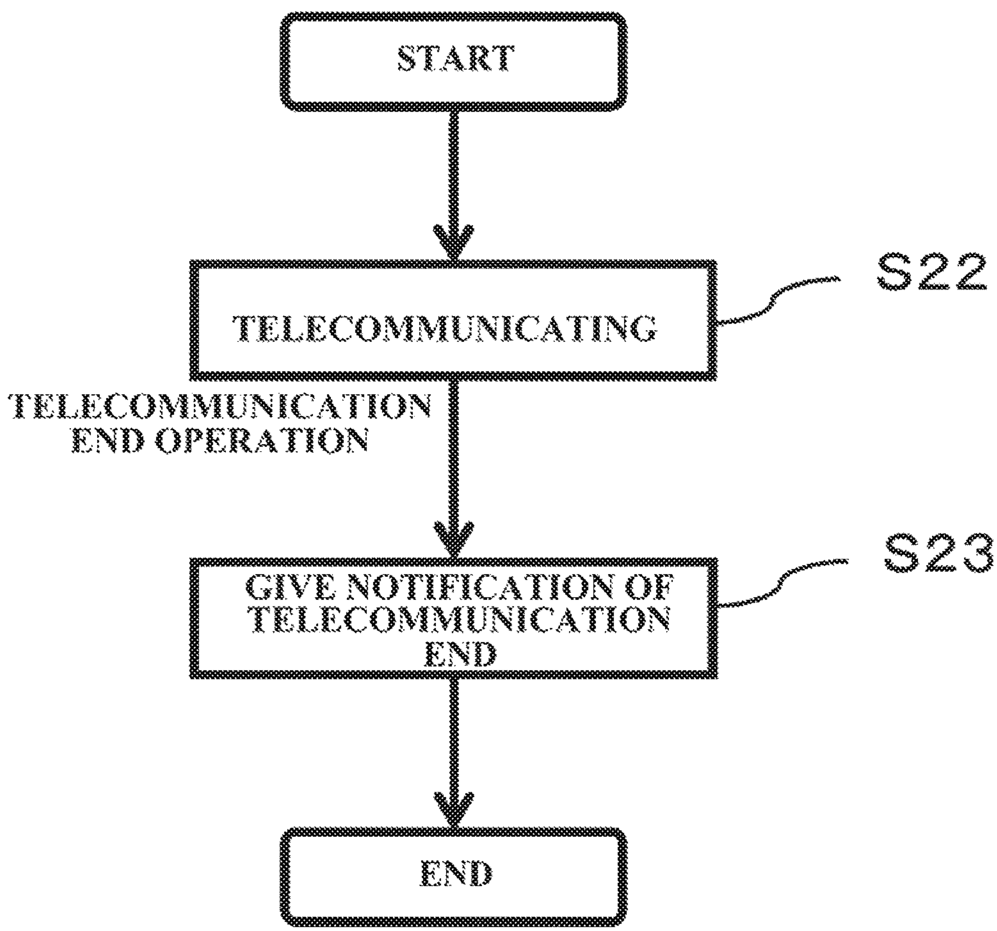
FIG. 7 is a diagram illustrating an example operation flowchart until a telecommunication ends after a the telecommunication between a call-originator terminal and a call-destination call center terminal starts in the call center system according to the embodiment of the present invention.

FIG. 7 is a diagram illustrating an example operation flowchart after the telecommunication between the call-destination telecommunication device 114 and the call-originator telecommunication device 106 starts, and until this telecommunication ends. The operation of the call-originator terminal 101 and that of the call center 100 will be explained below with reference to this FIG. 7.

When the telecommunication between the call-destination telecommunication device 114 and the call-originator telecommunication device 106 starts, the process advances to step S22.

The call-originator telecommunication device 106 and the call-destination telecommunication device 114 continue, in the step S22, the telecommunication until a telecommunication end operation is given, and when the agent who operates the call-destination telecommunication device 114 gives the telecommunication end operation or the customer who operates the call-originator telecommunication device 106 gives the telecommunication end operation, the telecommunication ends, and the process advances to step S23.

The telecommunication end operation is a unique end operation to the telecommunication device, and is, for example, to place the telephone receiver or to depress a telecommunication end button.

The telecommunication-status determining device 116 notifies, in the step S23 as a telecommunication end notification, the routing device 103 of the call-destination telecommunication device 114 becoming the telecommunication end status, and the process ends.

Figure 8:
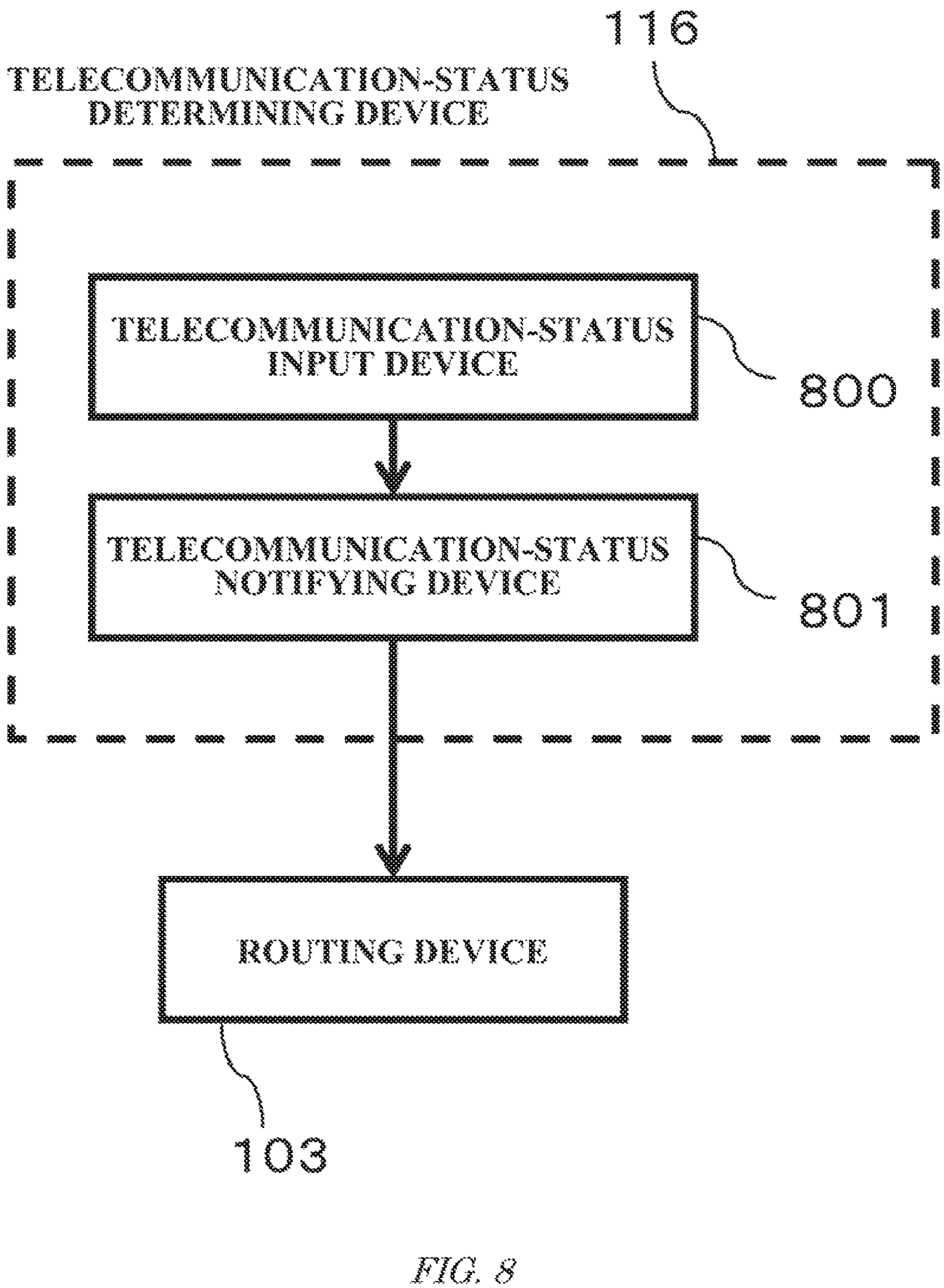
FIG. 8 is a schematic block diagram of a telecommunication-status determining device including a telecommunication-status input device in the call center system according to the embodiment of the present invention.

FIG. 8 is an example schematic block diagram of the telecommunication-status determining device 116. The telecommunication-status determining device 116 includes a telecommunication-status input device 800, and a telecommunication-status notifying device 801. The agent who operates the call-destination call center terminal 113 inputs the telecommunication start status when the telecommunication with the customer starts, and inputs the telecommunication end status when the telecommunication with the customer ends using the telecommunication-status input device 800. The telecommunication-status notifying device 801 transmits the input telecommunication start status or telecommunication end status to the routing device 103.

Figure 9:
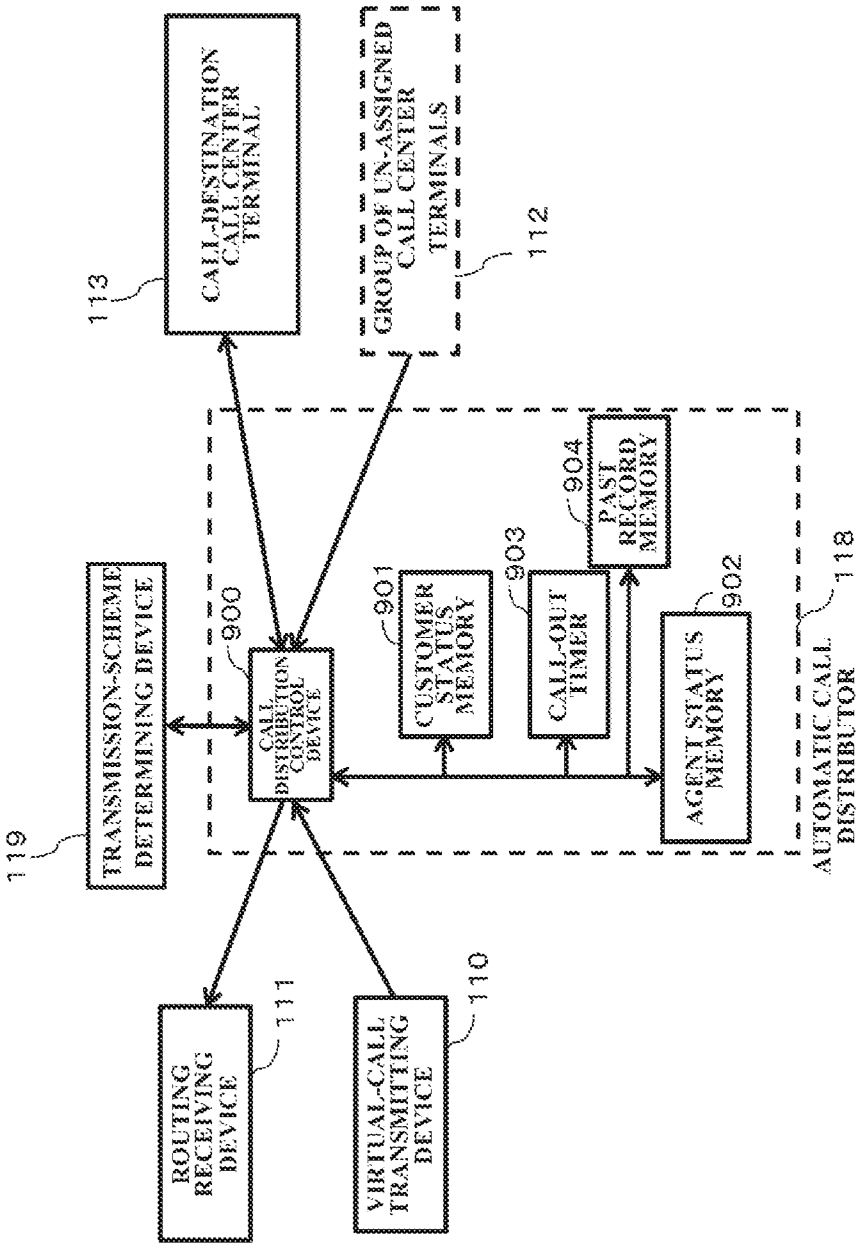
FIG. 9 is a schematic block diagram of an automatic call distributor in the call center system according to the embodiment of the present invention.

FIG. 9 is an example schematic block diagram of the automatic call distributor 118. The automatic call distributor 118 includes a call distribution control device 900, a customer status memory 901, an agent status memory 902, a call-out timer 903, and a past record memory 904.

Figure 10:
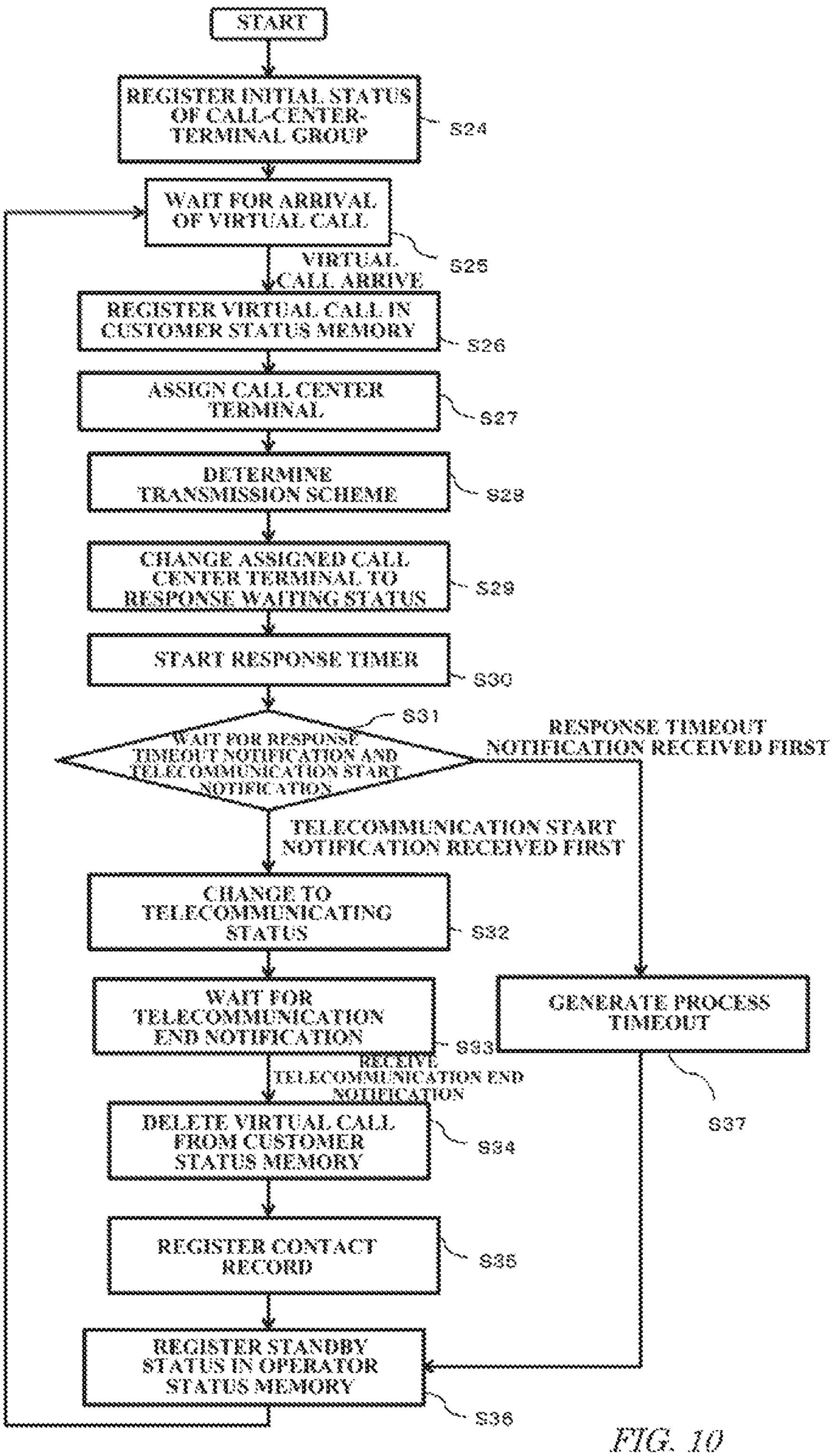
FIG. 10 is a diagram illustrating an example operation flowchart for the automatic call distributor in the call center system according to the embodiment of the present invention.

FIG. 10 is a diagram illustrating an example operation flowchart for the automatic call distributor 118. The operation of the automatic call distributor 118 will be explained below with reference to this FIG. 10.

When the activation of the call center 100 starts, in order to initialize the automatic call distributor 118, the process advances to step S24.

The call distribution control device 900 registers, in the step S24, information on all terminals included in the call-center-terminal group 102 in the agent status memory 902 with the agent status being as "standby status", and the process advances to step S25.

Example candidates of the agent status are the "standby status" indicating that the call-originator terminal 101 is assignable, a "response waiting status" after the call-originator terminal 101 is assigned and before a telecommunication therewith starts, a "telecommunicating status" indicating a telecommunication with the customer, and an "away-from-seat status" indicating away from the seat.

As an example, a method of storing, using a table illustrated in FIG. 11 as the agent status memory 902 in the step S24, a set of network ID, agent's skill, agent status, telecommunication party, and status change time and date corresponding to a call center terminal as a single row is applicable. The skill of the agent indicates a response capability of the agent to the call-out purpose of the customer. When the agent status is "response waiting status" or "telecommunicating status", the network ID of the assigned call-originator terminal 101 is stored in the entry that is telecommunication party, and this entry is left as empty or is filled as "none" in other cases. A time and date at which the agent status changes is stored in the entry that is status change time and date. In FIG. 11, the call center terminal with the network ID "op1.oooooo.co.jp" is in the "standby status" to which the call-originator terminal 101 is assignable, and there is no telecommunication party yet, thus the entry that is "telecommunication party" is filled as "none", and a time and date at which the status becomes "standby status" is "2013/2/1, 00:00:00". Conversely, the call center terminal with the network ID "op2.oooooo.co.jp" is in the "telecommunicating status" with the customer, and the network ID of this telecommunication party is "c1.oooooo.co.jp:80", and a time and date at which the status becomes the "telecommunicating status" is "2013/2/1, 22:00:00".

The call distribution control device 900 waits for, in the step S25, the arrival of the virtual call from the virtual-call transmitting device 110, and when the virtual call arrives, the process advances to step S26.

The call distribution control device 900 registers, in the step S26, the arrived virtual call in the customer status memory 901 with the customer status being as "call arriving status", and the process advances to step S27. The operation from the step S26 to the step S27 corresponds to the call distributing process in the step S5 illustrated in FIG. 2.

Example candidates of the customer status are the "call arriving status" after the virtual call arrives and before a telecommunication starts, and a "telecommunicating status" indicating a telecommunication with the agent.

As an example, a method of storing, using a table illustrated in FIG. 12 as the customer status memory 901 in the step S26, a set of network ID of the call-originator terminal 101, call-originator name, call-out purpose, customer status, telecommunication party, and status change time and date corresponding to a virtual call as a single row is applicable. When the customer status is "telecommunicating status", the network ID of the telecommunicating call-destination call center terminal 113 is stored in the entry that is telecommunication party, and this entry is filled as "none" in other statuses. A time and date at which the customer status changes is stored in the entry that is the status change time and date. In FIG. 12, the call-originator terminal with the network ID "c2.oooooo.co.jp:80" is in the "call arriving status", and there is no telecommunication party yet, thus the entry that is "telecommunication party" is filled as "none", and a time and date at which the status becomes "call arriving status" is "2013/2/1, 22:00:01". Conversely, the call-originator terminal with the network ID "c1.oooooo.co.jp:80" is in the "telecommunicating status" with the agent, and the network ID of this telecommunication party is "op2.oooooo.co.jp", and a time and date at which the status becomes the "telecommunicating status" is "2013/2/1, 22:00:00".

The call distribution control device 900 assigns, in the step S27, an appropriate call center terminal among the call-center-terminal group 102 as the call-destination call center terminal 113 to the virtual call, and the process advances to step S28.

As an example method of assigning the call-destination call center terminal 113 to the call-originator terminal 101 in the step S27, a method of assigning a call center terminal with the oldest status change time and date among the call center terminals which have the agent's skill equivalent to the call-out purpose of the virtual call from the call-originator terminal 101, and which also have the agent status that is "standby status" is applicable using the table illustrated in FIG. 11 as the agent status memory 902.

The call distribution control device 900 notifies, in the step S28, the transmission-scheme determining device 119 of the virtual call, and the process advances to step S29. Note that this notified transmission-scheme determining device 119 determines, in the step S6 illustrated in FIG. 2, the transmission scheme.

The call distribution control device 900 changes, in the step S29, the registered agent status of the call-destination call center terminal 113 stored in the agent status memory 902 to "response waiting status", changes the registered telecommunication party to the call-originator network ID of the virtual call, and changes the registered status change time and date to the present time and date, and, the process advances to step S30.

The call distribution control device 900 starts, in the step S30, the response timer of the call-out timer 903, and the process advances to step S31.

When, in the step S31, the call distribution controller 900 receives a telecommunication start notification from the telecommunication-status determining device 116 of the call-destination call center terminal 113 before receiving a response timeout notification from the call-out timer 903, the process advances to step S32. When the call distribution controller receives the response timeout notification from the call-out timer 903 before receiving the telecommunication start notification from the telecommunication-status determining device 116, the process advances to step S37.

In the step S32, the registered agent status of the call-destination call center terminal 113 stored in the agent status memory 902 is changed to the "telecommunicating status", the registered status change time and date is changed to the present time and date, the registered customer status of the virtual call from the call-originator terminal 101 and stored in the customer status memory 901 is changed to the "telecommunicating status", the registered telecommunication party is changed to the network ID of the call-destination call center terminal 113, and the registered status change time and date is changed to the present time and date, and, the process advances to step S33.

The call distribution control device 900 waits for, in the step S33, the telecommunication end notification from the telecommunication-status determining device 116, and when the telecommunication end notification is received, the process advances to step S34.

The call distribution control device 900 deletes, in the step S34 from the customer status memory 901, the virtual call from the call-originator terminal 101 that has end the telecommunication, and the process advances to step S35.

The call distribution control device 900 registers, in the step S35 in the past record memory 904, a set of call-originator network ID, call-originator name, network ID of call-destination call center terminal 113 that was the telecommunication party, and present time and date obtained from the context information in the virtual call, and the process advances to step S36.

As an example, a method of allocating, using a table illustrated in FIG. 13 ad the past record memory 904 in the step S35, a set of four entries that are the call-originator network ID, the call-originator name, the network ID of the call-destination call center terminal 113 that was the telecommunicating party, and the present time and date to a string of the "call-originator network ID", the "call-originator name", the "telecommunication party", and the "status change time and date", and storing as a single row is applicable.

The call distribution control device 900 changes, in the step S36, the registered agent status of the call-destination call center terminal 113 stored in the agent status memory 902 to the "standby status", changes the registered telecommunication party to "none", and changes the registered status change time and date to the present time and date, and, the process returns to the step S25.

The routing device 103 generates, in the step S37, a process timeout, and the process advances to the step S36.

Effect of First Embodiment

As explained above, according to the first embodiment, the call distributing process of transmitting the virtual call from the call-originator terminal 101 to the routing device 103 for the customer who attempts to call out the call center 100, and causing the routing device 103 to assign, as the call-destination call center terminal 113, a terminal in the call-center-terminal group 102 including the plurality of terminals is executed. Next, an actual call is transmitted between the call-originator telecommunication device 106 and the call-destination telecommunication device 114 in accordance with the result of the call distributing process, and a telecommunication is executed.

That is, the routing device 103 is irrelevant to the signaling process, and necessary context information for selecting the call-destination call center terminal 113 is separately transmitted from the call-originator terminal 101 as the virtual call, and the signaling process is executed directly between the selected call-destination call center terminal 113 and the call-originator terminal 101.

Hence, the routing device 103 is capable of executing the call distributing process using the independent virtual call from the telecommunication device, and when the routing device 103 is set up to cope with plural kinds of telecommunication devices, it is unnecessary to implement a process in accordance with the unique signaling specification to the telecommunication device, and it is sufficient to simply make a set-up that is compatible with the virtual call.

In addition, since the virtual call is independent from the telecommunication device, and the routing device 103 is not involved in the signaling process, installation of the routing device 103 is enabled even in a telecommunication system that has the telecommunication-device signaling specification not available to the public.

When, for example, the call-originator telecommunication device 106 to be controlled by the call-originator-telecommunication-device control device 107 is the Skype telecommunication device, by calling out the automatic call distributor 118 using the virtual call, the Skype number of the transmission-destination Skype telecommunication device is obtainable, enabling the call-originator-telecommunication-device control device 107 to cause the transmission-originator Skype telecommunication device to transmit an actual call to the transmission-destination Skype number in accordance with the unique signaling specification to the Skype. As explained above, the virtual call is independent from the unique signaling specification to the Skype telecommunication device.

In addition, the method of the call-originator-telecommunication-device control device 107 and the call-destination-telecommunication-device control device 115 for transmitting an actual call to the call-originator telecommunication device 106 and the call-destination telecommunication device 114 utilizes a different control command for, for example, each call-originator telecommunication device 106. In many cases, necessary information to transmit a call to the specific telecommunication device using this control command is only the ID indicating the transmission-destination telecommunication device. Example IDs indicating the telecommunication device are a telephone number in the case of the PSTN, an SIP address in the case of the SIP telephone, a unique ID in the case of the FaceTime, and a Skype number in the case of the Skype. As an example method of externally controlling the telecommunication device to transmit an actual call to the telecommunication device with the transmission-destination ID, the API called URL scheme in the case of the FaceTime, and the API called Skype URIs in the case of the Skype are applied. When the telecommunication device has such an API to start a transmission of a call, it is easy for the call-originator-telecommunication-device control device 107 and the call-destination-telecommunication-device control device 115 to cause the telecommunication device to transmit an actual call.

In addition, since the virtual call is independent from the telecommunication device, the virtual call may contain context information relating to the customer and not contained in signaling of an actual call regardless of the unique signaling specification. For example, the above virtual call contains pieces of context information which are the transmission scheme designation, the call-originator URL, and the call-out inquiry, and which are not contained in the call of the FaceTime. The context information is utilized by the routing device 103, and the agent is assigned in accordance with the present status of the customer and the intent thereof.

Still further, the automatic call distributor in conventional call center systems interrupts the signaling between the telecommunication devices, and thus the context information relating to the customer and obtained from a transmitted call is limited to information contained in the unique signaling specification to the telecommunication device. In the case of, for example, the PSTN, what is obtainable from the arrived call by the automatic call distributor is the telephone number of the transmission originator or the like contained in the signaling, and in order to obtain further context information, it is necessary to once start a telecommunication, and to prompt the customer to input further context information like the purpose of call using, for example, an automatic voice response (IVR). In this case, obtainment of context information from a call, such as what purpose the customer is calling out the call center, where the customer is presently located, what Web page the customer is browsing, and appropriate distribution of the call based on such context information to start the telecommunication are difficult. Conversely, according to this embodiment, since the context information is not limited to information contained in the unique signaling specification to the telecommunication device, there is an advantageous effect that the agent becomes able to refer the context information when having a telecommunication with the customer by, for example, displaying such context information on the context display device 117.

In particular, information on the Web page that is presently opened and browsed by the customer can be known from the call-originator URL, and thus there is an advantageous effect that visual information is sharable between the customer and the agent when the agent opens and browses the call-originator URL.

In addition, since the context information contains the call-out inquiry, the purpose of the call-out can be transmitted to the agent, and thus the agent is capable of serving the customer with the purpose of call being known beforehand.

Still further, since the context information contains the call-originator name, the name of the call-originator can be transmitted to the agent, and thus the agent is capable of serving the customer with the name of customer being known beforehand.

Since the virtual call contains the context information that is the transmission scheme designation, it becomes possible to designate either the general transmission scheme or the call-back scheme for the call-out to the call center. The call-back scheme needs less calling costs with the call-back scheme, and thus this is advantageous for the call center system that enables the customer to select either the general transmission scheme or the call-back scheme.

Since the virtual call contains the context information that is the call-out purpose, the automatic call distributor 118 is capable of preferentially assigns the agent who has a skill corresponding to the call-out purpose.

The routing device 103 includes the transmission-scheme determining device 119, and the transmission-scheme determining device 119 is capable of determining the transmission scheme in accordance with the transmission scheme designation. Hence, there is an advantageous effect that a single routing device is compatible with two types of transmission schemes that are the general transmission scheme and the call-back scheme.

Since the telecommunication-status determining device 116 includes the telecommunication-status input device 800, there is an advantageous effect that the telecommunication status of the call-destination telecommunication device 114 is notifiable to the routing device 103 regardless of the type of the telecommunication device.

In addition, according to the first embodiment, the call-out device 104 of the call-originator terminal 101, the virtual call device 105, and the call-originator-telecommunication-device control device 107 are operable on the Web browser. Hence, the necessary operation environments for the customer to call out the call center 100 are only the Web browser and the call-originator telecommunication device 106, and thus there is an advantageous effect that other special program installation work is unnecessary.

First Modified Example

As a modified example of the first embodiment, the call-out device 104 may include one or more buttons, and the customer may depress such a button as the call-out operation in the step S1 to the call center 100 from the call-originator terminal 101.

Figures 14, 15:
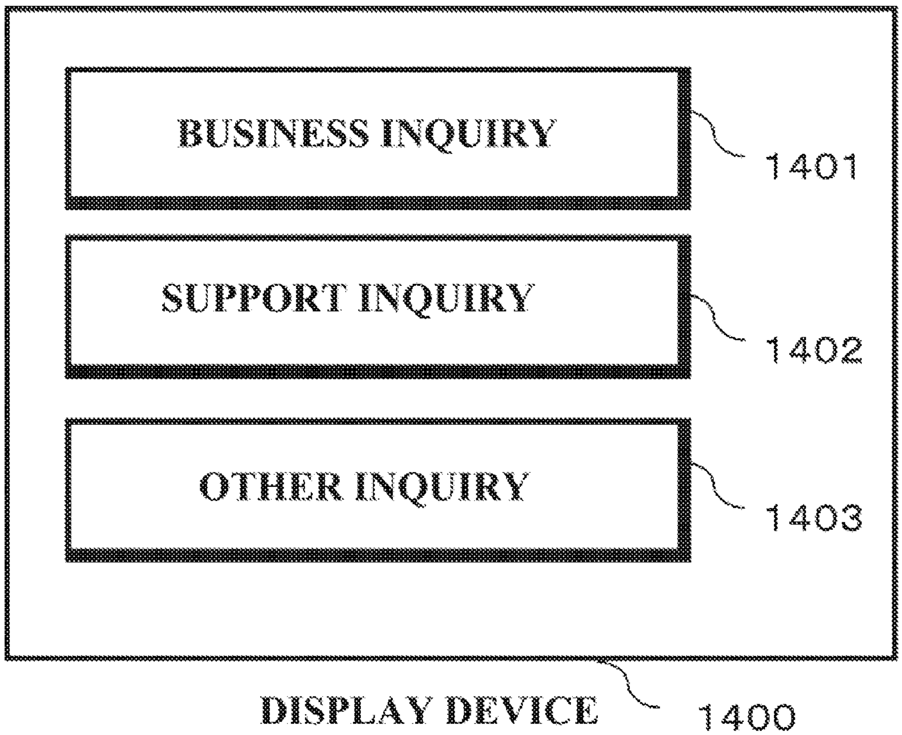
FIG. 14 is a diagram illustrating an example screen of the call-out device with a plurality of buttons in the call center system according to the embodiment of the present invention.
FIG. 15 is a diagram illustrating an example table utilized for the transmission-destination storing device in the call center system according to the embodiment of the present invention.

FIG. 14 is a diagram illustrating an example call-out device 104 that includes a plurality of buttons, and the call-out device 104 includes a display device 1400. The display device 1400 includes three buttons that are a button 1401, a button 1402, and a button 1403 which can be depressed by the customer, and which have respective character strings "business inquiry", "support inquiry", and "other inquiry" described to indicate respective call-out purposes.

As for the method of defining the call-out purpose as the context information contained in the virtual call, the different inquiries may be associated with the plurality of buttons of the display device 1400 in FIG. 13, respectively, and the inquiry associated with the depressed button by the customer may be determined as the call-out purpose.

FIG. 15 is a diagram illustrating an example transmission-destination storing device 109, and as for the network IDs of the routing devices of the plurality of call centers that are candidate call-destinations, a call center ID given for each call center and the corresponding network ID are stored as a single row in a table illustrated in FIG. 15.

As for the method of the virtual call transmitting device 110 to obtain the stored network ID in the transmission-destination storing device 109 in the step S2, the call center ID is associated with each of the plurality of buttons of the display device 1400 in FIG. 14, and the network ID corresponding to the call center ID associated with the depressed button by the customer is obtained from the table illustrated in FIG. 15. In FIG. 15, when the associated call center ID with the depressed button by the customer is "1", the same value as the call center ID "1" is retrieved from the row of call center IDs in the table illustrated in FIG. 15, and thus the target network ID "http://acd.oooooo.co.jp/" is obtained by the virtual call transmitting device 110.

Effect of First Modified Example

When the call-originator terminal 101 has no Web browser, the call-out device is implementable using the buttons of the display device other than the Web browser.

Second Modified Example

The call-out operation to the call center 100 using the call-out device 104 may be carried out by not only the explicit operation given by the customer but also a timer process.

Figure 16:
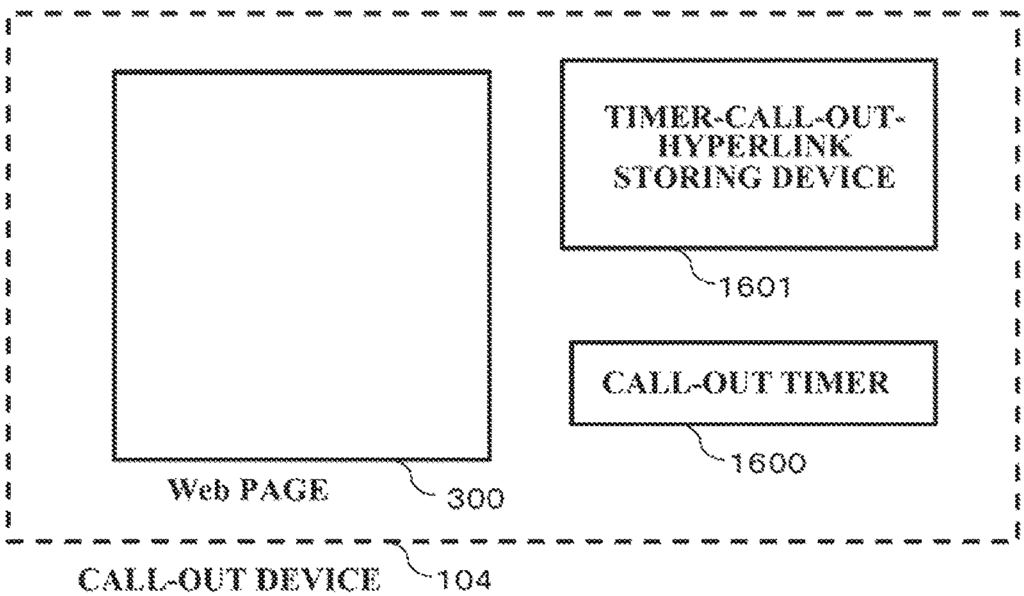
FIG. 16 is a schematic block diagram of a call-out device that executes a timer process in the call center system according to the embodiment of the present invention.

FIG. 16 is a schematic block diagram illustrating an example call-out device 104 that executes a timer process. The call-out device 104 includes, in addition to the Web page 300, a call-out timer 1600, and a timer-call-out-hyperlink storing device 1601.

The call-out timer 1600 is a timer that counts a time while the customer is browsing the web page 300.

The timer-call-out-hyperlink storing device 1601 stores a hyperlink to be selected through the timer process executed by the call-out timer 1600.

Figure 17:
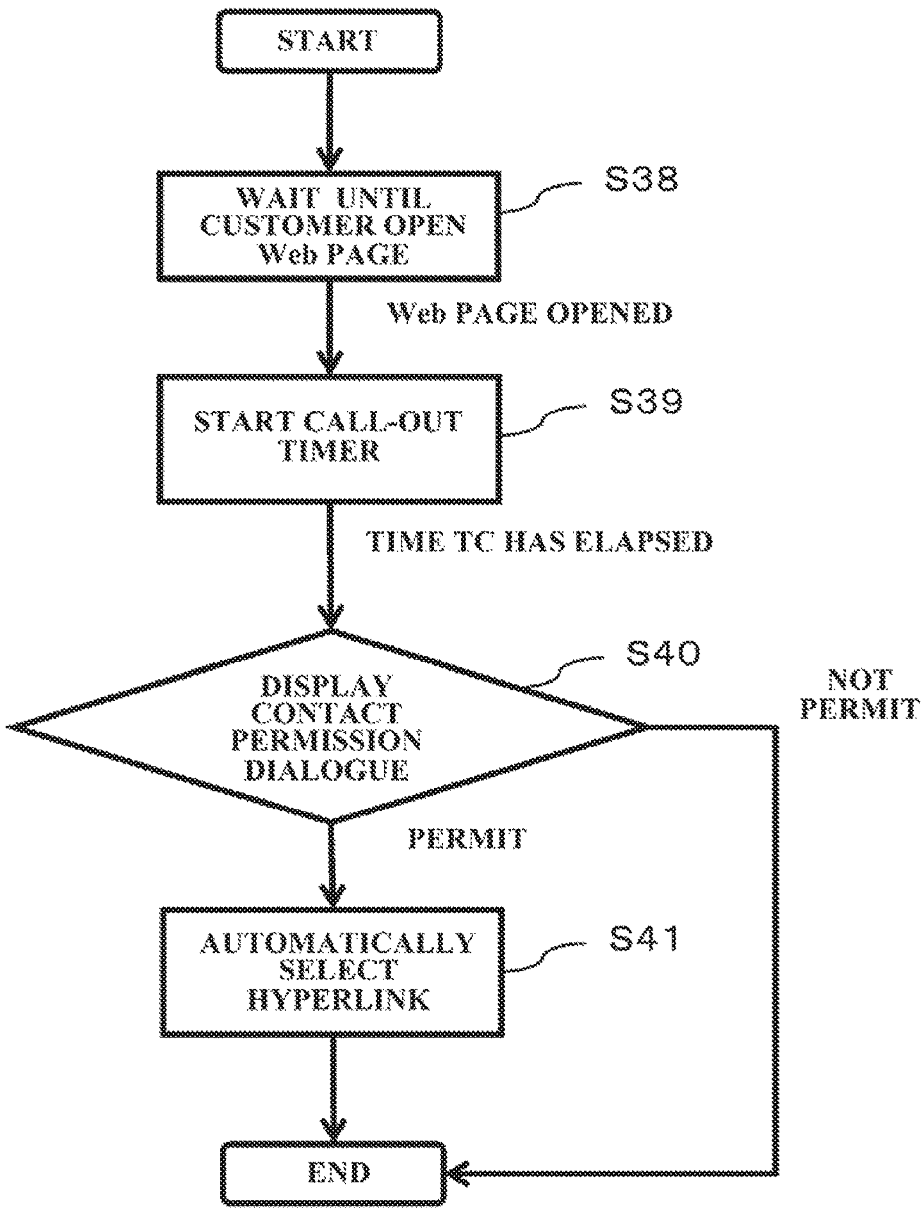
FIG. 17 is a diagram illustrating an example operation flowchart for the call-out device that executes the timer process in the call center system according to the embodiment of the present invention.

FIG. 17 is a diagram illustrating an example operation flowchart for the call-out device 104 that executes the timer process. With reference to this FIG. 17, an operation of the call-out device 104 that executes the timer process will be explained below.

The call-out device 104 waits for, in step S38, an opening of the Web page 300 of this call-out device by the customer, and when the web page is opened, the process advances to step S39.

The call-out timer 1600 is activated in the step S39 at a clock time at which the customer opens the Web page 300. With the customer keeping opening the Web page 300, when the elapsed time of the call-out timer 1600 reaches a preset time TC, the process advances to step S40.

A contact permission dialogue is displayed in the step S40 on the Web page 300.

Figures 18, 19:
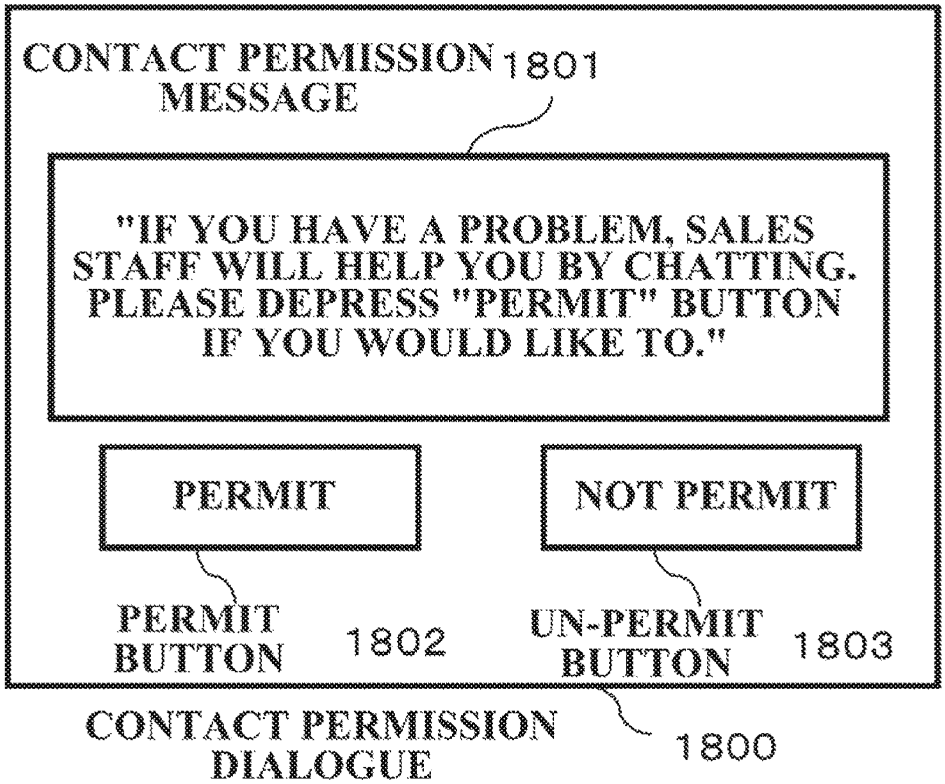
FIG. 18 is a diagram illustrating an example contact permission dialogue in the call center system according to the embodiment of the present invention.
FIG. 19 is a diagram illustrating an example table utilized for the agent status memory with a skill being omitted in the call center system according to the embodiment of the present invention.

FIG. 18 illustrates an example contact permission dialogue. A contact permission dialogue 1800 includes a contact permission message 1801, a permit button 1802, and an un-permit button 1803.

The contact permission message 1801 contains details for inquiring whether or not a telecommunication from the agent to the customer is acceptable. The permit button 1802 is a button for the customer to accept the details in the contact permission message. The un-permit button 1803 is a button for the customer to deny the details in the contact permission message.

When the customer depresses, in the step S40, the permission button 1802, the process advances to step S41. When the customer depresses the un-permission button 1803, the process ends at this step.

The call-out device 104 automatically selects, in the step S41, the hyperlink stored in the timer-call-out-hyperlink storing device 1601, thereby executing the call-out operation.

Note that the step S40 may be omitted. In this case, instead of the process advancement from the step S39 to the step S40, the process advances to the step S41, and no contact permission dialogue 1800 is displayed in this case.

Effect of Second Modified Example

With the customer keeping opening the Web page 300, when a certain time has elapsed, there is a possibility that the customer has an interest in the details of the Web page 300, and is reading carefully. At this time, by automatically selecting a hyperlink and starting a telecommunication with the agent, the agent becomes able to contact the customer, and thus a sales opportunity with an interested customer is obtained.

The reason why the contact permission dialogue 1800 is displayed to inquire whether or not a telecommunication from the agent to the customer is acceptable is for the smooth start of contact from the agent to the customer. In the cases of stores in the actual world, when a sales staff contacts a customer at a first time, by talking and confirming whether or not a conversation with the sales staff is acceptable, such as "can I help you?", and "I will coordinate you if you would like to.", a service in accordance with the intent of the customer is carried out. Likewise, in the call center system, the contact permission dialogue 1800 is displayed instead of talking to the customer, and whether or not a conversation is acceptable is confirmed, thereby accomplishing a smooth start of the contact from the agent to the customer.

When the step S40 is omitted, no contact permission dialogue 1800 is displayed, and thus the customer needs no depress operation to the permit button 1802 when the agent starts a telecommunication with the customer. When the customer is not familiar with the call center system, by omitting the step S40, there is an advantageous effect that the burden of the customer is decreased. For example, with the customer keeping opening the Web page 300, when a certain time has elapsed, there is a possibility that the unfamiliar customer is in trouble with how to operate the call-out device 104. When the customer does not know how to operate well, there is also a possibility that the customer does not know the depress operation to the permit button 1802. In this case, an automatic contact from the agent to the customer without any operation may help the customer.

The Web page 300 in FIG. 3 may have no customer-name input form 304. In this case, the call-originator name in the context information automatically becomes anonymous.

Effect of Third Modified Example

When the call-originator name automatically becomes anonymous, an operation work for the customer to input the customer's name can be omitted.

Fourth Modified Example

As for the method of assigning, in the step S27, the call-destination call center terminal 113 to the virtual call, a method of retrieving, among all contact records registered in the table in a past record memory 904 illustrated in FIG. 13, a set of the value of call-originator network ID row and the value of call-originator name row that matches a set of the value of the network ID row for the call-originator terminal 101 registered in the table in the customer status memory 901 illustrated in FIG. 12 and the value of the call-originator name row, and assigning, among the retrieval results, the call center terminal which has the network ID that is the value of the telecommunication party with the contact record that is the latest status change time and date, and which also has the agent status that is "standby status" is applicable. That is, the virtual call is a merely an activation signal for the automatic call distributor 118 to select the call-destination call center terminal 113.

Effect of Fourth Modified Example

By referring to the contact record in the past record memory 904, the same agent who contacted, last time, the customer who is utilizing a given call-originator terminal 101 can be assigned.

Fifth Modified Example

As for the method of assigning, in the step S27, the call-destination call center terminal 113 to the virtual call, a method of assigning the call center terminal that has the oldest status change time and date among the call center terminals which have the agent status that is "standby status" using a table illustrated in FIG. 19 as the agent status memory 902 instead of the table illustrated in FIG. 11 is also applicable. That is, the virtual call is a merely an activation signal for the automatic call distributor 118 to select the call-destination call center terminal 113.

Effect of Fifth Modified Example

The table illustrated in FIG. 19 is the table illustrated in FIG. 11 which has the row of skill omitted. By omitting the row of skill, a simpler call center without a consideration on the skill of the agent is accomplished.

Sixth Modified Example

As for the method for determining the transmission scheme in the step S6 by the transmission-scheme determining device 119, the transmission scheme may be the call-back scheme when the virtual call contains the call-originator telecommunication device ID, and may be the general transmission scheme in other cases. This is because, in the case of the general transmission scheme, it is not always necessary for the virtual call to contain the call-originator telecommunication device ID, and thus the transmission-scheme determining device is capable of determining that the transmission scheme is not the general transmission scheme when the virtual call contains such an ID.

Effect of Sixth Modified Example

Since the transmission scheme can be defined based on only the presence-absence of the call-originator telecommunication device ID, there is an advantageous effect that the transmission scheme designation in the virtual call may be omitted.

Seventh Modified Example

As for the method for determining the transmission scheme in the step S6 by the transmission-scheme determining device 119, the transmission scheme may be the call-back scheme when the virtual call does not contain the call-originator network ID, and may be the general transmission scheme in other cases. This is because, when the virtual call does not contain the call-originator network ID, the routing device 103 is unable to notify the call-originator terminal 101 of necessary information for the transmission of a telecommunication in the general transmission scheme.

Effect of Seventh Modified Example

Since the transmission scheme can be defined based on only the presence-absence of the call-originator network ID, there is an advantageous effect that the transmission scheme designation in the virtual call may be omitted.

Eighth Modified Example

When the process of the executed program by the telecommunication device can be monitored externally, the telecommunication-status determining device 116 may be accomplished by such a monitoring.

Figure 20:
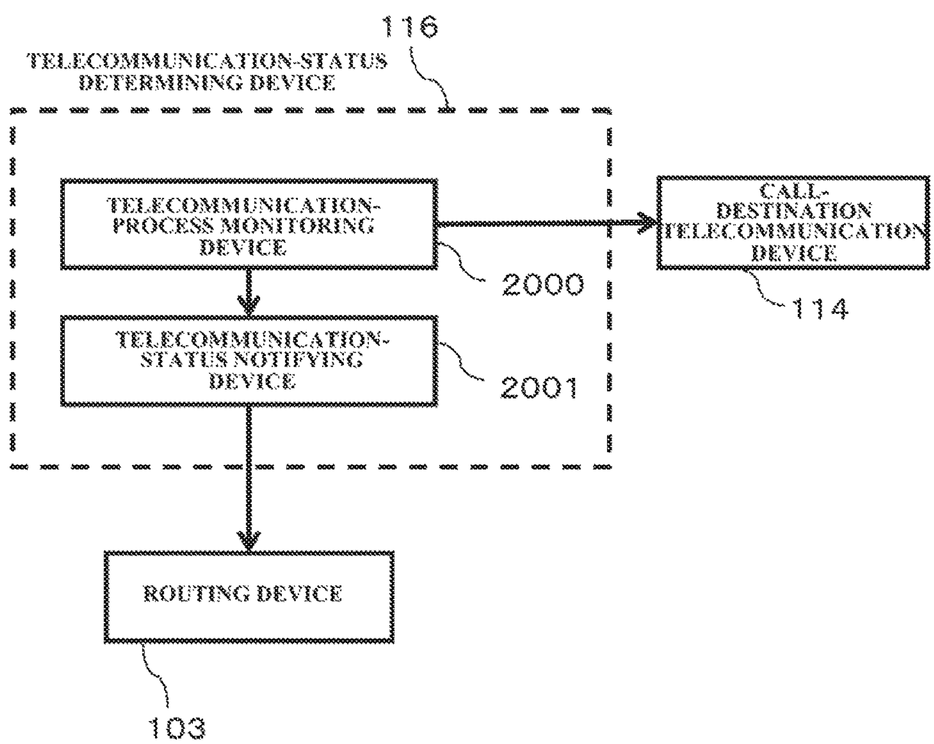
FIG. 20 is a schematic block diagram of the telecommunication-status determining device including a telecommunication-process monitoring device in the call center system according to the embodiment of the present invention.

FIG. 20 is a schematic block diagram illustrating an example telecommunication-status determining device 116 that monitors the process of the executed program by the telecommunication device. The telecommunication-status determining device 116 includes a telecommunication-process monitoring device 2000 and a telecommunication-status notifying device 2001. The telecommunication-process monitoring device 2000 monitors a telecommunication status of the call-destination telecommunication device 114, and the telecommunication-status notifying device 2001 notifies the routing device 103 of a telecommunication start status when it is determined, upon monitoring, that a telecommunication between the call-originator telecommunication device 106 and the call-destination telecommunication device 114 starts, and of a telecommunication end status when it is determined, upon monitoring, that the telecommunication between the call-originator telecommunication device 106 and the call-destination telecommunication device 114 end.

As for the method of monitoring the telecommunication status of the call-destination telecommunication device 114 by the telecommunication-process monitoring device 2000, a process of the program generated when the telecommunication starts is monitored, the telecommunication-process monitoring device determines that the telecommunication starts when such a process is generated, and determines that the telecommunication ends when the process is eliminated.

As for the method of monitoring the telecommunication status of the call-destination telecommunication device 114 by the telecommunication-process monitoring device 2000, a network connection established when the telecommunication starts may be monitored, the telecommunication-process monitoring device may determine that the telecommunication starts when such a network connection is established, and determines that the telecommunication ends when the network connection is discontinued.

As for the method of monitoring the telecommunication status of the call-destination telecommunication device 114 by the telecommunication-process monitoring device 2000, when the call-destination telecommunication device 114 has a telecommunication-status API that gives a notification of the start of the telecommunication and the end thereof, the method may be accomplished by such a telecommunication-status API.

Effect of Eighth Modified Example

Since the telecommunication-process monitoring device 2000 automatically determines the telecommunication status, it is unnecessary for the agent to manually determine.

Ninth Modified Example

Upon the set-up made in which the general transmission scheme is always selected in the step S6 in the first embodiment and illustrated in FIG. 2, the call-destination-telecommunication-device control device 115 may be omitted.

Effect of Ninth Modified Example

In the case of a call center service that needs only the general transmission scheme, a set-up is made so as to always select the general transmission scheme and to omit the call-destination-telecommunication-device control device 115, the call center system may be simplified.

10th Modified Example

Upon the set-up made in which the call-back scheme is always selected in the step S6 in the first embodiment and illustrated in FIG. 2, the call-originator-telecommunication-device control device 107 may be omitted.

Effect of 10th Modified Example

In the case of a call center service that needs only the general transmission scheme, a set-up is made so as to always select the call-back scheme and to omit the call-originator-telecommunication-device control device 107, the call center system may be simplified.

11th Modified Example

Upon the set-up made in which the call-back scheme is always selected in the step S6 in the first embodiment and illustrated in FIG. 2, the call-originator-telecommunication-device control device 107 may be omitted.

Effect of 11th Modified Example

In the case of a call center service that needs only the call-back scheme, a set-up is made so as to always select the call-back scheme and to omit the call-originator-telecommunication-device control device 107, the call center system may be simplified.

Second Embodiment

An explanation will be given below of a second embodiment. In the first embodiment, the number of telecommunication devices of the call-originator terminal 101 and that of the call-destination call center terminal 113 are each one, but each terminal has a plurality of telecommunication devices in the second embodiment.

Figure 21:
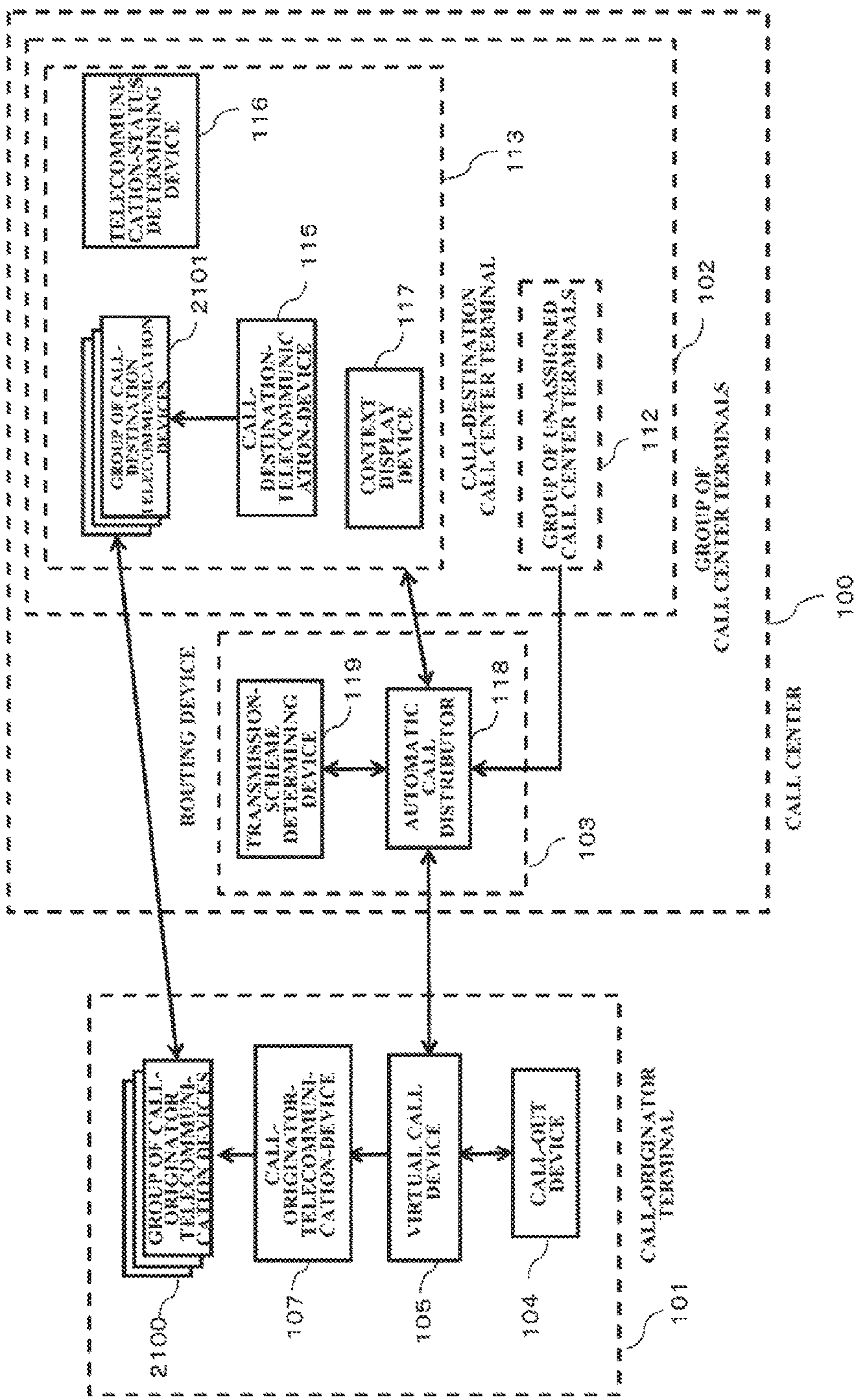
FIG. 21 is a schematic block diagram of a call center system according to an embodiment of the present invention in a case in which the terminal includes a plurality of telecommunication devices.

FIG. 21 is a schematic block diagram illustrating an example call center system according to the second embodiment. In comparison with the structure of the call-center system in the first embodiment illustrated in FIG. 1, the second embodiment employs the same structure as that of the first embodiment except that the call-originator terminal 101 includes a group 2100 containing a plurality of different types of call-originator telecommunication devices instead of the single call-originator telecommunication device 106, and the call-destination call center terminal 113 includes a group 2101 containing a plurality of different types of call-destination telecommunication devices instead of the single call-destination telecommunication device 114.

The context information contains a telecommunication-device type designation that designates the type of the telecommunication device utilized for an actual telecommunication in the call-originator terminal 101. FIG. 22 illustrates an example virtual call that is the example virtual call illustrated in FIG. 4 to which the telecommunication-device type designation is added. The telecommunication-device designation is added as <telecommunication-device type designation> element 2200 that is a sub element of the <virtual call> element.

In the second embodiment, the type of the telecommunication device is designated in the call-out device 104, and the automatic call distributor 118 determines, based on the telecommunication-device type designation, the type of the telecommunication device applied for a telecommunication between the call-originator terminal 101 and the call-destination terminal 113. In the case of general transmission scheme, the call-originator-telecommunication-device control device 107 controls, in the call-originator-telecommunication-device group 2100, a call-originator telecommunication device corresponding to the determined type of the telecommunication device to start a transmission of an actual call, and in the case of the call-back scheme, the call-destination-telecommunication-device control device 115 controls, in the call-destination-telecommunication-device group 2101, a call-destination telecommunication device corresponding to the determined type of telecommunication device to start a transmission of an actual call. As for other operations, the same procedure as that of the first embodiment is applied.

Figure 23:
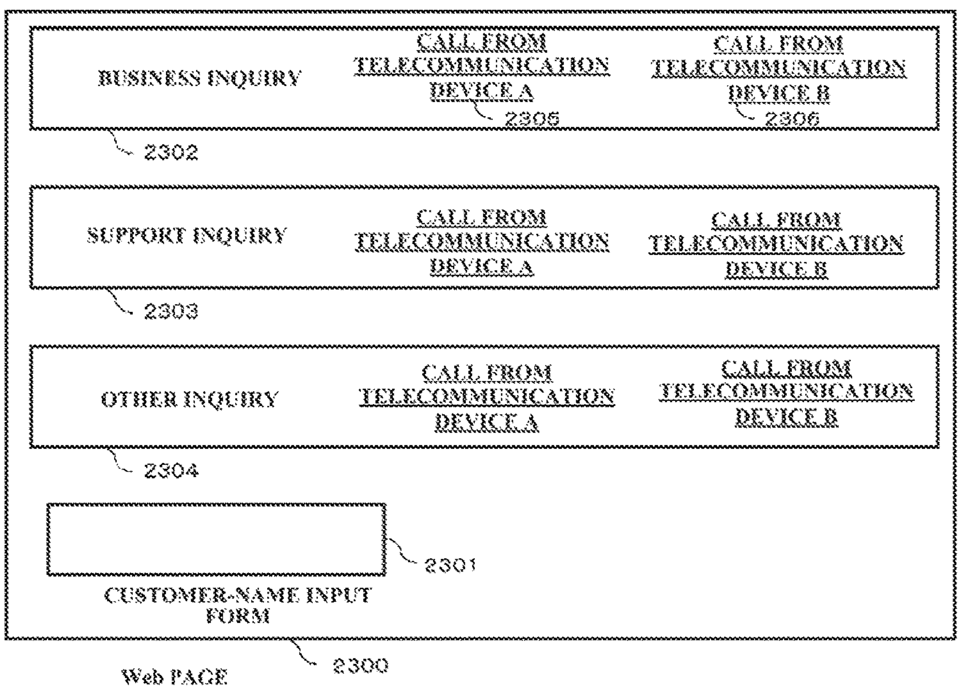
FIG. 23 is a diagram illustrating an example call-out device in the call center system with the terminal that includes the plurality of telecommunication devices according to the embodiment of the present invention.

FIG. 23 is a diagram illustrating an example call-out device 104 according to the second embodiment. The call-out device 104 is a Web page 2300 operable on the Web browser, and the Web page 2300 contains a plurality of hyperlinks and a customer name input form 2301. With the customer name input form 2301 being filled with the customer's name or being left as empty, when the customer selects one of the hyperlinks, a call-out operation to the call center 100 is executed. In FIG. 23, as the call-out purposes that are selectable by the customer on the Web page 2300, entries that are a "business inquiry" 2302, a "support inquiry" 2303, and an "other inquiry" 2304 are displayed, and each call-out purpose has entries which enable a selection of the telecommunication device applicable for a telecommunication, and which are a "call from telecommunication device A" hyperlink 2305, and a "call from telecommunication device B" hyperlink 2306.

The virtual-call transmitting device 110 obtains, in the step S3 in FIG. 2, the network ID of the routing device 103 and the telecommunication-device type designation from the hyperlink on the Web page 2300 and selected by the customer in the step S1. The hyperlink of the Web page 2300 in FIG. 23 is associated with an HTML element illustrated in FIG. 24, and for example, as for the HTML element to render the "call from telecommunication device A" hyperlink 2305 for the entry "business inquiry" 2302 on the Web browser, an HTML element illustrated in FIG. 24 is associated. When the customer selects, in the step S1, the "call from telecommunication device A" hyperlink 2305, in the URL "http://acd.oooooo.co.jp/A" indicated by the href attribute of the HTML element, a part "http://acd.oooooo.co.jp" indicating the host name is obtained as the network ID, and the subsequent remaining part "A" is obtained as the telecommunication-device type designation by the virtual call transmitting device 110.

Figures 25, 26:
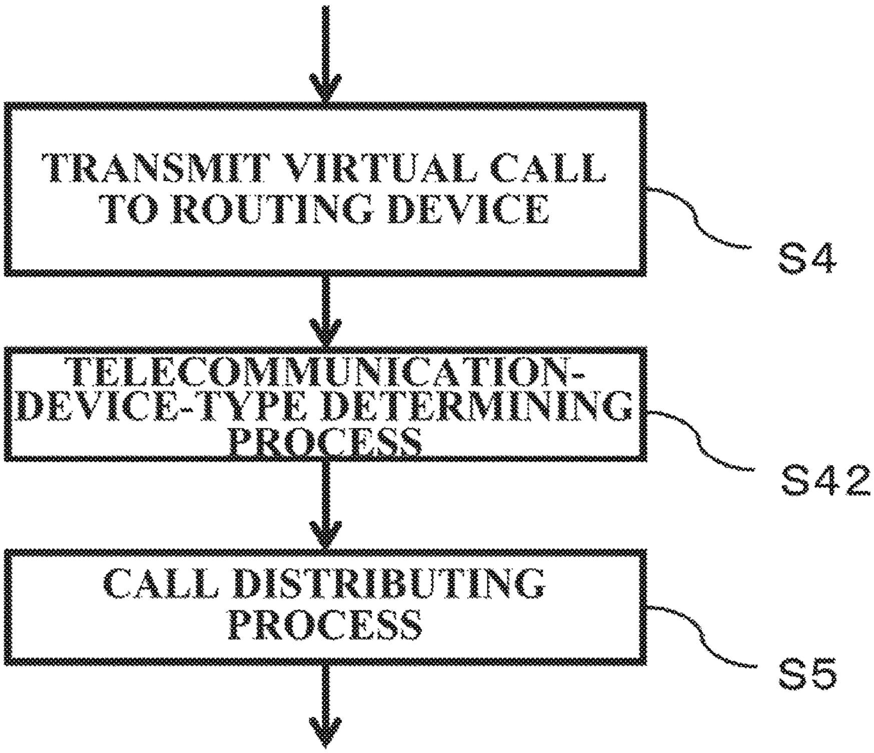
FIG. 25 is a diagram illustrating an example operation flowchart for a call-originator terminal to call out a call center in the call center system with the terminal that includes the plurality of telecommunication devices according to the embodiment of the present invention.
FIG. 26 is a diagram illustrating an example table utilized for the agent status memory in the call center system with the terminal that includes the plurality of telecommunication devices according to the embodiment of the present invention.

FIG. 25 is a diagram illustrating an example operation flowchart for the call-out originator 101 in the first embodiment to call out the call center 100 illustrated in FIG. 2 to which a telecommunication-device-type determining process of the second embodiment is added.

In FIG. 25, a step S42 is inserted between the step S4 and the step S5 in FIG. 2. In the step S42, the communication-device-type determining process is executed. The automatic call distributor 118 determines the type of the telecommunication device indicated by the telecommunication-device type designation as the type of the telecommunication device to be utilized for a telecommunication.

In the operation flowchart illustrating the detail of the call distributing process in the step S5 and illustrated in FIG. 10, in the step S26, a table illustrated in FIG. 26 is applied as an example agent status memory 902. This table is the table illustrated in FIG. 11 and to which a row of "telecommunication device type" indicating a list of telecommunication device types with which a call center terminal is compatible is added.

As for the method of assigning, in the step S27, the call-destination call center terminal 113 to the virtual call, among the call center terminals which have the telecommunication device type to be utilized for the telecommunication determined in the step S42 and contained in the list of the telecommunication device types for the agent, have the skill of the agent corresponding to the call-out purpose of the virtual call, and have the agent status that is "standby status", a call center terminal that has the oldest status change time and date is assigned using the table illustrated in FIG. 26 as the agent status memory 902.

When the transmission scheme is the general transmission scheme, the telecommunication device type to be utilized for the telecommunication determined in the step S42 is transmitted in the step S8 together with the telecommunication device ID. The call-originator-telecommunication-device control device 107 transmits, in the step S10, a control command for transmission to the telecommunication device corresponding to the telecommunication device type in the call-originator telecommunication device groups 2100.

When the transmission scheme is the call-back scheme, the telecommunication device type to be utilized for the telecommunication determined in the step S42 is transmitted in the step S15 together with the telecommunication device ID. The call-destination-telecommunication-device control device 115 transmits, in the step S17, a control command for transmission to the telecommunication device corresponding to the telecommunication device type in the call-destination telecommunication device groups 2101.

Effect of Second Embodiment

Since the virtual call is irrelevant to the telecommunication device, a call distribution process to the plurality of different telecommunication devices is executable by a single call center system.

According to conventional call center systems, when the customer has a plurality of different types of telecommunication devices with respective different signaling specifications, it is necessary that the telecommunication device ID of the transmission destination to call out the call center is a telecommunication device ID in accordance with each signaling specification different one by one. Conversely, since the virtual call is irrelevant to the telecommunication device, it is sufficient for the call-center call-out to simply transmit the virtual call to a single call center ID even if the customer has a plurality of telecommunication devices with different signaling specifications from each other.

Since the customer is capable of selecting one of the plurality of different telecommunication devices to call out the call center, the customer is allowed to utilize the telecommunication device in accordance with the feature thereof, such as a telecommunication device only for voice, a telecommunication device utilizing video and sound, a telecommunication device utilizing video, sound, and text chatting, and a telecommunication device utilizing video, sound, text chatting, and image sharing.

REFERENCE SIGNS LIST

100 Call center
101 Call-out originator
102 Call-center-terminal group
103 Routing device
104 Call-out device
105 Virtual call device
106 Call-originator telecommunication device
107 Call-originator-telecommunication-device control device
108 Virtual call generating device
109 Transmission-destination storing device
110 Virtual call transmitting device
111 Routing receiving device
112 Un-assigned call-center-terminal group
113 Call-destination call center terminal
114 Call-destination telecommunication device
115 Call-destination-telecommunication-device control device

116 Telecommunication-status determining device
117 Context displaying device
118 Automatic call distributor
119 Transmission-scheme determining device
300 Web page of the call-out device
301 Hyperlink of business inquiry
302 Hyperlink of support inquiry
303 Hyperlink of other inquiry
304 Customer-name input form
400 <Virtual call> element
401 <Transmission scheme designation> element
402 <Call-originator URL> element
403 <Call-originator network ID> element
404 <Call-originator telecommunication device ID> element
405 <Call-out purpose> element
406 <Call-originator name> element
800 Telecommunication-status input device
801 Telecommunication-status notifying device
900 Call distribution control device
901 Customer status memory
902 Agent status memory
903 Call-out timer
904 Past record memory
1400 Display device of call-out device
1401 Button of business inquiry
1402 Button of support inquiry
1403 Button of other inquiry
1600 Call-out timer
1601 Timer-call-out-hyperlink storing device
1800 Contact permission dialogue
1801 Contact permission message
1802 Permit button
1803 Un-permit button
2000 Telecommunication-process monitoring device
2001 Telecommunication-status notifying device
2100 Group of call-originator telecommunication device
2101 Group of call-destination telecommunication device
2200 <Telecommunication-device type designation> element
2300 Web page of call-out device
2301 Customer-name input form
2302 Entry of "business inquiry"
2303 Entry of "support inquiry"
2304 Entry of "other inquiry"
2305 "Call from telecommunication device A" hyperlink
2306 "Call from telecommunication device B" hyperlink

The invention claimed is:

1. A call center system comprising:

a call center comprising a plurality of call center terminals utilized by an agent for telecommunication;

a call-originator terminal utilized by a customer for telecommunication; and, a transmission-scheme determining device determining whether the call-originator terminal is a transmission originator or a transmission destination for an actual call, the call-originator terminal comprising a virtual call device transmitting a different signal to the call center from signaling, the call center comprising an automatic call distributor selecting one of the plurality of call center terminals upon receiving the signal from the virtual call device, and the call-originator terminal and the call center both comprising respective telecommunication-device control devices giving, to the transmission originator, which is the call center terminal selected by the automatic call distributor or the call-originator terminal and which is determined according to the transmission-scheme determining device, a telecommunication device ID of the transmission destination, which is the call center terminal selected by the automatic call distributor or the call-originator terminal and which is determined according to the transmission-scheme determining device, and causing the transmission originator to start signaling for transmitting the actual call to the transmission destination based on the telecommunication device ID.

2. The call center system according to claim 1, wherein:

the virtual call device transmits the signal to the call center, the signal containing necessary selection material information for selecting the call center terminal; and the automatic call distributor selects the one of the plurality of call center terminals based on the selection material information.

3. The call center system according to claim 2, wherein the selection material information indicates a call-out purpose of a user of the call-originator terminal to the call center.

4. The call center system according to claim 1, wherein the automatic call distributor:

comprises a past record memory storing a set of the call-originator terminal and an agent that had a telecommunication therewith last time, beforehand; and selects the call center terminal utilized by the agent stored in the past record memory.

5. The call center system according to claim 1, wherein the automatic call distributor selects the call center terminal having a longest standby status.

6. The call center system according to claim 1, wherein the virtual call device transmits the signal to the call center, the signal containing information on the call-originator terminal and a user of the call-originator terminal.

7. The call center system according to claim 6, wherein the information on the user of the call-originator terminal indicates a name of the user of the call-originator terminal.

8. The call center system according to claim 1, wherein the virtual call device transmits the signal to the call center, the signal containing telecommunication-device-type data indicating a type of a telecommunication device for transmitting the actual call.

9. The call center system according to claim 1, wherein the virtual call device transmits the signal to the call center, the signal containing a transmission-scheme-designation data indicating whether the call-originator terminal is a transmission originator or a transmission destination for the actual call.

10. The call center system according to claim 1, wherein:

the call-originator terminal comprises a data display device; and the virtual call device transmits the signal to the call center, the signal containing display details on the data display device.

11. The call center system according to claim 1, wherein:

the virtual call device transmits the signal to the call center, the signal containing data indicating a transmission scheme; and the transmission-scheme determining device determines whether the call-originator terminal is the transmission originator or the transmission destination based on the data indicating the transmission scheme.

12. The call center system according to claim 1, wherein:

the virtual call device is capable of transmitting the signal to the call center, the signal containing the telecommunication device ID of the call-originator terminal; and the transmission-scheme determining device:

determines that the call-originator terminal is the transmission destination when the telecommunication device ID is transmitted from the virtual call device, and transmits the telecommunication device ID to the selected call center terminal by the automatic call distributor; and determines that the call-originator terminal is the transmission originator when no telecommunication device ID is transmitted from the virtual call device, and transmits the telecommunication device ID of the selected call center terminal by the automatic call distributor to the call-originator terminal.

13. The call center system according to claim 1, wherein the call center terminal comprises a telecommunication-status determining device notifying the automatic call distributor of a telecommunication status of the call center terminal.

14. The call center system according to claim 1, wherein the call center terminal comprises a context display device displaying various information contained in the signal transmitted by the virtual call device.

15. A non-transitory computer accessible medium storing a program for a call center system, the system comprising computers serving as a call center comprising a plurality of call center terminals utilized by an agent for telecommunication, and a call-originator terminal utilized by a customer for telecommunication, the program causing:

the call center to function as a transmission-scheme determining device determining whether the call-originator terminal is a transmission originator or a transmission destination for an actual call;

the call-originator terminal to function as a virtual call device transmitting a different signal to the call center from signaling;

the call center to function as an automatic call distributor selecting one of the plurality of call center terminals upon receiving the signal from the virtual call device, and both of the call-originator terminal and the call center to function as respective telecommunication-device control devices giving, the transmission originator which is the call center terminal selected by the automatic call distributor or the call-originator terminal and which is determined according to the transmission-scheme determining device, a telecommunication device ID of the transmission destination, which is the call center terminal selected by the automatic call distributor or the call-originator terminal and which is determined according to the transmission-scheme determining device, and causing the transmission originator to start signaling for transmitting the actual call to the transmission destination based on the telecommunication device ID.

16. A non-transitory computer accessible medium according to claim 15, wherein the virtual call device transmits the signal to the call center, the signal containing a transmission-scheme-designation data indicating whether the call-originator terminal is a transmission originator or a transmission destination for the actual call.

17. A non-transitory computer accessible medium according to claim 15, wherein:

the virtual call device transmits the signal to the call center, the signal containing data indicating a transmission scheme; and the transmission-scheme determining device determines whether the call-originator terminal is the transmission originator or the transmission destination based on the data indicating the transmission scheme.

18. A non-transitory computer accessible medium according to claim 15, wherein:

the virtual call device is capable of transmitting the signal to the call center, the signal containing the telecommunication device ID of the call-originator terminal; and the transmission-scheme determining device:

determines that the call-originator terminal is the transmission destination when the telecommunication device ID is transmitted from the virtual call device, and transmits the telecommunication device ID to the selected call center terminal by the automatic call distributor; and determines that the call-originator terminal is the transmission originator when no telecommunication device ID is transmitted from the virtual call device, and transmits the telecommunication device ID of the selected call center terminal by the automatic call distributor to the call-originator terminal.

* * * * *